(12) United States Patent
Wittner et al.

(10) Patent No.: US 11,979,472 B2
(45) Date of Patent: May 7, 2024

(54) DIGITAL COMMUNICATION MODULE FOR A SELF-CONTAINED MEDICAL DEVICE COMMUNICATION PLATFORM

(71) Applicant: Gambro Lundia AB, Lund (SE)

(72) Inventors: Bernd Wittner, Minneapolis, MN (US); Aghohgo Ekpruke, Stillwater, MN (US)

(73) Assignee: Gambro Lundia AB, Lund (SE)

( * ) Notice: Subject to any disclaimer, the term of this patent is extended or adjusted under 35 U.S.C. 154(b) by 0 days.

(21) Appl. No.: 17/928,781

(22) PCT Filed: Jun. 2, 2021

(86) PCT No.: PCT/EP2021/064847
§ 371 (c)(1),
(2) Date: Nov. 30, 2022

(87) PCT Pub. No.: WO2021/245163
PCT Pub. Date: Dec. 9, 2021

(65) Prior Publication Data
US 2023/0231931 A1    Jul. 20, 2023

Related U.S. Application Data

(60) Provisional application No. 63/033,937, filed on Jun. 3, 2020.

(51) Int. Cl.
*H04L 67/56* (2022.01)
*H04L 67/12* (2022.01)

(52) U.S. Cl.
CPC .............. *H04L 67/56* (2022.05); *H04L 67/12* (2013.01)

(58) Field of Classification Search
CPC ......... H04L 67/56; H04L 67/12; H04L 67/55; H04L 67/5651; H04L 67/14; H04L 67/141; H04L 67/563; H04L 67/567; H04L 69/40
See application file for complete search history.

(56) References Cited

U.S. PATENT DOCUMENTS 10,071,202 B2    9/2018  Handler
10,434,246 B2 *  10/2019 Silkaitis ................. G16H 20/17
(Continued)

OTHER PUBLICATIONS

International Search Report—International Application No. PCT/EP2021/064847 dated Oct. 26, 2021—7 pages.
(Continued)

*Primary Examiner* — Kim T Nguyen
(74) *Attorney, Agent, or Firm* — K&L Gates LLP

(57) ABSTRACT

A digital communication module for a self-contained medical device communication platform is disclosed herein. In an example, a digital communication module is communicatively coupled to a therapy module of a medical device for relaying medical device data to an electronic medical record ("EMR") server that is connected to a medical network. The digital communication module is connected to at least one other digital communication module via a wireless proprietary network that is separate from the medical network. The digital communication module determines that the medical device data from the medical device is to be transmitted, via the wireless proprietary network, to one of the other digital communication modules that is connected to the EMR server via the medical network. The other of the digital communication modules receives, and then routes the medical device data to the EMR server via the medical network.

21 Claims, 13 Drawing Sheets

(56) References Cited

U.S. PATENT DOCUMENTS

2018/0374562 A1* 12/2018 Savolainen ........... H04W 40/12
2021/0350896 A1* 11/2021 Shelton, IV ...... A61M 5/31565

OTHER PUBLICATIONS

Written Opinion—International Application No. PCT/EP2021/064847 dated Sep. 6, 2021—17 pages.

* cited by examiner

CRRT 1: Disposable Usage
*M100 (x2), Dia soln (x5), Repl. Soln (x2) {36hrs}*

CRRT 2: Disposable Usage
*HF1000 (x3), Dia soln (x5), Repl. Soln (x2) {72hrs}*

CRRT 3: Disposable Usage
*ST150 (x3), Warmer Bag (x2), Repl. Soln (x2) {12hrs}*

CRRT n: Disposable Usage
*HF1000 (x3), Dia soln (x5), PBP Soln (x6) {72hrs}*

DIGITAL COMMUNICATION MODULE FOR A SELF-CONTAINED MEDICAL DEVICE COMMUNICATION PLATFORM

PRIORITY CLAIM

This application is a national phase entry of PCT/EP2021/064847, filed Jun. 2, 2021, which claims priority to U.S. Provisional Patent Application No. 63/033,937, filed Jun. 3, 2020, the entire disclosures of which are incorporated by reference herein.

BACKGROUND

Medical networks for healthcare facilities typically connect to a significant number of medical devices. Generally, known medical networks include a local area network ("LAN") and/or wireless LAN ("WLAN"), such as Wi-Fi or Ethernet connectivity. In such a network, connected medical devices transmit medical treatment data and/or medical event data (e.g., alarms or alerts) to a centralized gateway or server. The centralized server or gateway then stores the medical treatment data and/or medical event data to appropriate patient electronic medical records ("EMRs"). The centralized server may also transmit the medical treatment data and/or medical event data to clinician computers for monitoring. If permitted, the centralized server may also route prescriptions and/or medical device programming instructions to the appropriate medical device.

In the above-described medical network, medical devices have been configured only with a destination network address of the centralized server or gateway. As such, communication is limited to connections that are between the medical devices and the centralized server or gateway. As described above, the server or gateway determines how the medical treatment data and/or medical event data is to be routed on the medical network. The known medical networks leave medical devices at edges or endpoints of the network, which limits or prevents interconnectivity of the medical devices.

Another known issue with medical networks is that their overall operability is limited to network configurations specified by the healthcare facility. As medical networks in healthcare facilities are designed for security and reliability, enhanced features or device interconnectivity are typically not considered or deployed in known medical networks. In an example, a medical device may include enhanced network operability, such as an ability to communicate with other medical devices or sensors. However, such features are operable only if the medical network is configured to permit inter-device communication. Often, healthcare facilities do not modify or upgrade their networks to support such features due to the costs, effort, and potential risks. Adapting a network to support specific features for tens to hundreds of different medical devices is cumbersome and risks one feature or medical device disrupting the entire network. As a result of the limited functionality provided by medical networks, some medical device functionality is never used or even designed or implemented.

A need accordingly exists for a medical system that does not limit features or operations of medical devices. A need also exists for a medical system that enables medical device interconnectivity.

SUMMARY

Example systems, methods, and apparatus are disclosed herein that create a self-contained network implemented among medical devices. The medical devices disclosed herein include or are connected to a digital communication module ("DCM"). The digital communication module may also referred to as digital communication apparatus. The example DCM is positioned between a processor (or therapy module) of a medical device and a medical network. In some embodiments, the DCM is external to the medical device (connected via a serial connection or Ethernet connection). In other embodiments, the DCM is included within or integrated with a medical device.

According to a $1^{st}$ independent aspect, a medical system is provided comprising:
 at least one medical device (104) including:
  one or more sensors and one or more actuators,
  a memory, and
  a processor (107) configured to receive data from the one or more sensors and to control the one or more actuators to perform a medical task,
   wherein the processor (107) has access to said memory and is configured to store data including medical device data (303);
  a communication unit connected to the processor (107), the communication unit including at least one of serial input port, an Ethernet input port, and a wireless input port;
 at least one digital communication module (102) associated to the medical device (104), the digital communication module (102) comprising:
  an input interface (304) coupled for communication to the communication unit of the medical device (104), the input interface (304) including at least one of serial input port, an Ethernet input port, and a wireless input port;
  an output interface (306) configured for communicative coupling to (i) an electronic medical record (EMR) server (108) via a medical network (106) and (ii) at least one other digital communication module (102A) via a wireless proprietary network (400), the output interface (306) including at least one of a serial output port, an Ethernet output port, or a wireless output port;
  a file configuration manager (330) configured to store at least one configuration file (332) with an identifier of the digital communication module (102); and
  a data manager (302) communicatively coupled to the input interface (304), the output interface (306), and the file configuration manager (330), the data manager (302) configured to:
   after being powered on, transmit an awake message to the at least one other digital communication module (102A) via the wireless proprietary network (400), the awake message including the identifier of the digital communication module (102) and a date/time indication of the power on,
   receive a response message from each of the at least one other digital communication module (102A) via the wireless proprietary network (400), the response message including an identifier or network address of the respective other digital communication module (102A) and a date/time indication as to when the respective other digital communication module (102A) was powered on,
   receive medical device data (303) from the medical device (104),
   determine the medical device data (303) to be transmitted to the EMR server (108) via a first of the other digital communication modules (102A) that has an earliest date/time indication, and
transmit the medical device data (303) to the first digital communication module (102) for transmission to the EMR server (108).

In a 2nd independent aspect, a medical system is provided comprising:
at least one medical device (104) including:
one or more sensors and one or more actuators,
a memory, and
a processor (107) configured to receive data from the one or more sensors and to control the one or more actuators to perform a medical task,
wherein the processor (107) has access to said memory and is configured to store data including medical device data (303);
a communication unit connected to the processor (107), the communication unit including at least one of serial input port, an Ethernet input port, and a wireless input port;
at least one digital communication module (102) associated to the medical device (104), the digital communication module (102) comprising:
an input interface (304) coupled for communication to the communication unit of the medical device (104), the input interface (304) including at least one of serial input port, an Ethernet input port, and a wireless input port;
an output interface (306) configured for communicative coupling to (i) at least one other digital communication module (102A) via a wireless proprietary network (400), and (ii) a clinician device via the wireless proprietary network (400) or a direct wireless link, the output interface (306) including at least one of an Ethernet output port or a wireless output port;
a file configuration manager (330) configured to store at least one configuration file (332) with a network address or identifier of a clinician device and criteria for transmitting a notification to the clinician device; and
a data manager (302) communicatively coupled to the input interface (304), the output interface (306), and the file configuration manager (330), the data manager (302) configured to:
receive medical device data (303) from the medical device (104),
determine at least some of the medical device data (303) satisfies the criteria,
transmit a notification message to the clinician device (322) via the proprietary network (400) or the direct wireless link, the notification message being indicative of the at least some of the medical device data (303) satisfying the criteria.

In a further independent aspect, a process for transferring medical device data (303) from at least one medical device (104) to an EMR server (108) through at least one digital communication module (102) is provided, wherein the medical device (104) comprises:
one or more sensors and one or more actuators,
a memory, and
a processor (107) configured to receive data from the one or more sensors and to control the one or more actuators to perform a medical task,
wherein the processor (107) has access to said memory and is configured to store data including medical device data (303);

a communication unit connected to the processor (107), the communication unit including at least one of serial input port, an Ethernet input port, and a wireless input port;
wherein the digital communication module (102) comprises:
an input interface (304) coupled for communication to the communication unit of the medical device (104), the input interface (304) including at least one of serial input port, an Ethernet input port, and a wireless input port;
an output interface (306) configured for communicative coupling to (i) an electronic medical record (EMR) server (108) via a medical network (106) and (ii) at least one other digital communication module (102A) via a wireless proprietary network (400), the output interface (306) including at least one of a serial output port, an Ethernet output port, or a wireless output port;
a file configuration manager (330) configured to store at least one configuration file (332) with an identifier of the digital communication module (102); and
a data manager (302) communicatively coupled to the input interface (304), the output interface (306), and the file configuration manager (330),
the process comprising:
couple the digital communication module (102) to the medical device (104),
couple the digital communication module (102) to the EMR server (108),
after being powered on, transmit via the data manager (302) an awake message to the at least one other digital communication module (102A) via the wireless proprietary network (400), the awake message including the identifier of the digital communication module (102) and a date/time indication of the power on,
receive a response message from each of the at least one other digital communication module (102A) via the wireless proprietary network (400), the response message including an identifier or network address of the respective other digital communication module (102A) and a date/time indication as to when the respective other digital communication module (102A) was powered on,
receive medical device data (303) from the medical device (104),
determine the medical device data (303) to be transmitted to the EMR server (108) via a first of the other digital communication modules (102A) that has an earliest date/time indication, and
transmit the medical device data (303) to the first digital communication module (102) for transmission to the EMR server (108).

In the following paragraphs further details of the system and of the process are provided. The following aspects are directed to the system and to the communication module (per se or part of the system); however, the process steps carried out by the processor/s of the medical device/s and by the data manager/s of the digital communication module/s may also be part of the above described process for transferring medical device data.

In a 3rd aspect according to any one of the preceding aspects, the medical system comprises a plurality of medical devices (104) and a plurality of digital communication modules (102A-0, . . . , 102A-6), each of the plurality of medical devices (104) being associated to one respective digital communication module (102) of said plurality of digital communication modules (102A-0, . . . , 102A-6).

In a 4th aspect according to the preceding aspect, the plurality of medical devices (104) includes medical devices of different nature, chosen in the group including one or more apparatuses for the treatment of renal disease, one or more infusion pumps, one or more nutritional fluid delivery devices, one or more plasmapheresis machines and one or more purified water for medical use preparation machines.

In a 5th aspect according to any one of the preceding two aspects, the digital communication module (102) is configured as a gateway enabling the digital communication modules (102A-0, . . . , 102A-6) in a mesh-configuration network to communicate with each other separately from a medical network (106) associated with a healthcare facility.

In a 6th aspect according to any one of the preceding three aspects, the plurality of digital communication modules (102A-0, . . . , 102A-6) are configured to designate one digital communication module (102) as a node gateway that (optionally exclusively) connects with the medical network (106), in particular each of the plurality of digital communication modules (102A-0, . . . , 102A-6) transmits respective medical device data (303) at least to said node gateway digital communication module, which routes the received medical device data (303) to the medical network (108), optionally said node gateway digital communication module communicates with the medical network (106) at periodic intervals.

In a 7th aspect according to any one of the preceding four aspects, the plurality of digital communication modules (102A-0, . . . , 102A-6) are configured for communication with each other and create a self-contained proprietary wireless network (400) hosted by said plurality of digital communication modules, e.g., IoT gateways, that are associated with said plurality of medical devices (104).

In an 8th aspect according to the preceding aspect, the self-contained proprietary wireless network (400) is configured for transmitting medical device data (303) among digital communication modules (102A-0, . . . , 102A-6) for single-point transmission to the medical network (106).

In a further aspect 8th bis, the self-contained proprietary wireless network (400) is configured to share same medical device data (303) among digital communication modules (102A-0, . . . , 102A-6) connected to the self-contained proprietary wireless network (400).

In a 9th aspect according to any one of the preceding aspects, the medical device (104) is a medical fluid delivery machine, wherein the one or more actuators include one or more pumps.

In a 10th aspect according to any one of the preceding aspects, the medical device (104) is an apparatus for the treatment of renal disease, such as a continuous renal replacement therapy "CRRT" machine, a hemodialysis machine or a peritoneal dialysis machine, comprising a disposable line set, wherein the one or more actuators include one or more pumps.

In an 11th aspect according to any one of the preceding aspects, the medical device (104) is an apparatus for the treatment of renal disease with extracorporeal circulation of blood comprising:
  a filtration unit having a primary chamber and a secondary chamber separated by a semi-permeable membrane;
  a blood circuit comprising:
    a blood withdrawal line extending between a first end connected to an inlet of the primary chamber and a second end for connection to a patient; and
    a blood return line extending between a first end connected to an outlet of the primary chamber and a second end for connection to said patient;
  a blood pump to circulate blood in the blood circuit;
  a dialysate line connected to an outlet of the secondary chamber;
  optionally, one or more lines to transfer a respective solution into blood.

In a 12th aspect according to any one of the preceding aspects, the medical device data (303) comprises both medical treatment data and medical event data, such as alarms or alerts.

In a 13th aspect according to any one of the preceding aspects, the system further comprises a medical network (106) and an electronic medical record (EMR) server (108).

In a 14th aspect according to any one of the preceding aspects, the digital communication module (102) is external to a case of the medical device (104) and is physically connected to the medical device (104) via a serial connection or Ethernet connection or, alternatively, is connected via wireless connection.

In a 15th aspect according to any one of the preceding aspects 1 to 13, the digital communication module (102) is included within a case of the medical device (104) or integrated with the medical device (104).

In a 16th aspect according to any one of the preceding aspects, the system further comprises a medical network and an electronic medical record (EMR) server (108), wherein the medical network (106) includes at least one of a Wi-Fi network or an Ethernet network, the digital communication module (102) transmitting the medical device data (303) to the medical network for inclusion in the EMR server (108).

In a 17th aspect according to the preceding aspect, the medical network (106) includes at least one of a local area network "LAN", wireless LAN "WLAN", Ethernet network, Wi-Fi network and one or more communication elements in the group of gateways, routers, system hubs, switches, and network appliances for establishing communication connections and routing data, in particular the medical network (106) includes one or more firewalls that restrict access to only authorized remote devices.

In an 18th aspect according to any one of the preceding aspects when depending on aspect 7, the proprietary wireless communication network (400) is separate from a medical network.

In another aspect according to any one of the preceding aspects, the medical system includes the clinician device (322) connected to the digital communication module (102) through the proprietary network (400) or the direct wireless link, the clinician device (322) not necessitating a connection to the medical network (106) to receive the notification message, in particular the clinician device (322) being not connected to the medical network (106).

In a 19th independent aspect a digital communication module (102) is provided, comprising an input interface (304) configured for communicative coupling to a medical device (104), the input interface (304) including at least one of serial input port, an Ethernet input port, and a wireless input port;
  an output interface (306) configured for communicative coupling to (i) an electronic medical record (EMR) server (108) via a medical network (106) and (ii) at least one other digital communication module (102A) via a wireless proprietary network (400), the output interface (306) including at least one of a serial output port, an Ethernet output port, or a wireless output port;
  a file configuration manager (330) configured to store at least one configuration file (332) with an identifier of the digital communication module (102); and a data manager (302) communicatively coupled to the input interface (304), the output interface (306), and the file configuration manager (330), the data manager (302) configured to:

after being powered on, transmit an awake message to the at least one other digital communication module (102A) via the wireless proprietary network (400), the awake message including the identifier of the digital communication module (102) and a date/time indication of the power on, receive a response message from each of the at least one other digital communication module (102A) via the wireless proprietary network (400), the response message including an identifier or network address of the respective other digital communication module (102A) and a date/time indication as to when the respective other digital communication module (102A) was powered on, receive medical device data (303) from the medical device (104), determine the medical device data (303) to be transmitted to the EMR server (108) via a first of the other digital communication modules (102A) that has an earliest date/time indication, and transmit the medical device data (303) to the first digital communication module (102) for transmission to the EMR server (108).

In a 20$^{th}$ independent aspect a digital communication module (102) is provided, comprising:

an input interface (304) configured for communicative coupling to a medical device (104), the input interface (304) including at least one of serial input port, an Ethernet input port, and a wireless input port;

an output interface (306) configured for communicative coupling to (i) at least one other digital communication module (102A) via a wireless proprietary network (400), and (ii) a clinician device via the wireless proprietary network (400) or a direct wireless link, the output interface (306) including at least one of an Ethernet output port or a wireless output port;

a file configuration manager (330) configured to store at least one configuration file (332) with a network address or identifier of a clinician device and criteria for transmitting a notification to the clinician device; and a data manager (302) communicatively coupled to the input interface (304), the output interface (306), and the file configuration manager (330), the data manager (302) configured to:

receive medical device data (303) from the medical device (104), determine at least some of the medical device data (303) satisfies the criteria, transmit a notification message to the clinician device via the proprietary network (400) or the direct wireless link, the notification message being indicative of the at least some of the medical device data (303) satisfying the criteria.

The 19$^{th}$ and 20$^{th}$ independent aspects may be combined with any of the preceding aspects 1 to 18 and with the following aspects.

In a 21st aspect according to the preceding aspect, the wireless proprietary network (400) includes at least one of a Zigbee® wireless protocol, a Z-Wave® wireless protocol, a WeMo® wireless protocol, or a low-power wide-area network ("LPWAN") wireless protocol, and wherein the direct wireless link is provided using at least one of a Bluetooth® wireless protocol, a Bluetooth® mesh wireless protocol, or a Bluetooth® 5.0 wireless protocol.

In a 22$^{nd}$ aspect according to any one of the two preceding aspects, the direct wireless link is included as part of the wireless proprietary network (400).

In a 23$^{rd}$ aspect according to any one of the three preceding aspects, the criteria for the notification corresponds to at least one of an alarm, an alert, or an event.

In a 24$^{th}$ aspect according to any one of the preceding four aspects, the data manager (302) is further configured to:

allow authorized connection from the clinician device (322);

provide a template form requesting data as to which notifications are desired, including setting thresholds and/or conditions as to when the notifications are to be generated, in particular the template form requesting priorities for the alarms, event or alerts;

use template form data to set the criteria.

In a 25$^{th}$ aspect according to any one of the preceding five aspects, data manager (302) is configured to broadcast and rebroadcast the notification messages to ensure the message reaches the clinician device (322), wherein data manager (302) is configured to rebroadcast the notification message until either a maximum broadcasting time is reached, a maximum number of broadcasting has been made or an acknowledgement message when the notification message is received from the clinician device (322).

In a 26$^{th}$ aspect according to any one of the preceding aspects, the data manager (302) is further configured to:

receive a power off message from the first digital communication module (102) indicative that the first digital communication module (102) is no longer available;

remove the date/time indication of the first digital communication module (102);

receive second medical device data (303) from the medical device (104);

determine the second medical device data (303) is to be transmitted to the EMR server (108) via a second of the other digital communication modules (102A) that has an earliest date/time indication with the date/time indication of the first digital communication module (102) removed; and transmit the second medical device data (303) to the second digital communication module (102) for transmission to the EMR server (108).

In a 27$^{th}$ aspect according to any one of the preceding aspects, the data manager (302) is further configured to:

receive a power off message from the first digital communication module (102) indicative that the first digital communication module (102) is no longer available;

remove the date/time indication of the first digital communication module (102);

receive second medical device data (303) from the medical device (104);

determine the second medical device data (303) is to be transmitted to the EMR server (108) via the digital communication module (102) based on the digital communication module (102) having an earliest date/time indication among the other digital communication modules (102A); and transmit the second medical device data (303) to the EMR server (108) via the communicative coupling of the output interface (306) to the medical network (106).

In a 28$^{th}$ aspect according to the preceding aspect, the data manager (302) is further configured to:

receive third medical device data (303) from one of the other digital communication modules (102A); and transmit the third medical device data (303) to the EMR server (108) via the communicative coupling of the output interface (306) to the medical network (106).

In a 29th aspect according to any one of the preceding two aspects, the data manager (302) is further configured to:

designate a new first digital communication module (102) as a node gateway for transmission of the medical device data (303); and designate the new digital communication module (102) as the node gateway after receiving the power off message from the first digital communication module (102) and determining that the new digital communication module (102) has the earliest date/time indication among the other digital communication modules (102A).

In a 30th aspect according to the preceding aspect, the data manager (302) is further configured to disable the communicatively coupling to the EMR server (108) via the output interface (306) after designating the new first digital communication module (102) as the node gateway.

In a 31st aspect according to any one of the preceding aspects, the data manager (302) is further configured to:

receive first disposable or consumable usage information from the medical device (104);

receive second disposable or consumable usage information from the other digital communication modules (102A);

combine the first and second disposable or consumable usage information; and transmit the combined first and second disposable or consumable usage information to at least one of the EMR server (108) or a medical supply server via the communicative coupling of the output interface (306) to the medical network (106).

In a 32nd aspect according to the preceding aspect, the digital communication module (102) further comprises a database and a log manager (334) retaining a log file in the database (324) that tracks disposable/consumable usage.

In a 33rd aspect according to any one of the preceding two aspects, the first and second disposable or consumable usage information includes information that is indicative of usage of filters, disposable cassettes, line sets, dialysis solution, saline solution, renal replacement solution, warmer bags, or disposable sensors.

In a 34th aspect according to any one of the preceding three aspects, the processor (107) is configured to monitor the treatment delivery through the medical device and to determine, in particular at the end of a treatment session, disposable or consumable usage information including:

type and number of single use disposables that have been used and must be substituted to execute a subsequent treatment, such as disposable line sets; and/or type and number of semi-disposable elements that are exhausted or must be substituted, such as concentrates for dialysis fluid preparation or ultrafilters; and/or type and number of broken components that must be substituted, such as sensors or actuators, wherein the processor (107) stores the disposable or consumable usage information in the memory, the disposable or consumable usage information being transferred through the communication unit to the digital communication module (102).

In a 35th aspect according to any one of the preceding four aspects, the data manager (302) of each digital communication module (102) of a plurality of digital communication modules (102A-0, . . . , 102A-6) is configured to communicate its disposable or consumable usage information to the other digital communication modules, each digital communication module retaining a fleet aggregate information for all medical devices that are associated with the respective digital communication module part of the wireless proprietary network (400).

In a 36th aspect according to any one of the preceding five aspects, the digital communication module (102) receives an indication of available inventory, either entered into at least one of the medical devices or received from a server of the medical network (106) via the medical network interface (310), the data manager (302) comparing the disposable or consumable usage information with the indication of available inventory and generates a replenishment message including information on disposable or consumables that have to be replenished, wherein the replenishment message is sent to the medical network (106) for inventory tracking with a supplier.

In a 37th aspect according to any one of the preceding aspects, the wireless proprietary network (400) includes at least one of a Bluetooth® wireless protocol, a Bluetooth® mesh wireless protocol, a Bluetooth® 5.0 wireless protocol, a Zigbee® wireless protocol, a Z-Wave® wireless protocol, a WeMo® wireless protocol, or a low-power wide-area network ("LPWAN") wireless protocol, and wherein the medical network (106) includes at least one of a Wi-Fi network or an Ethernet network.

In a 38th aspect according to any one of the preceding aspects, the configuration file (332) specifies a destination network address of the EMR server (108), identification of a medical device (104) type of the connected medical device (104), an identification of a medical device (104) serial number, and a timestamp from which the received medical data was generated by the medical device (104) or received by the data manager (302) from the medical device (104).

In a 39th aspect according to any one of the preceding aspects, the data manager (302) is further configured to:

receive a stream of the medical device data (303);

create a snapshot of the medical device data (303) at periodic intervals; and provide the snapshot of the medical device data (303) as the medical device data (303) that is transmitted to the first digital communication module (102).

In a 40th aspect according to the preceding aspect, the periodic intervals have a period between five seconds and sixty seconds.

In a 41st aspect according to any one of the preceding two aspects, the data manager (302) is further configured to:

use event tracking to identify changes to the medical device data (303) between snapshots; and include only the changed medical device data (303) from a previous snapshot as the medical device data (303) that is transmitted to the first digital communication module (102).

In a 42nd aspect according to any one of the preceding aspects, the medical device (104) includes at least one of a continuous renal replacement therapy ("CRRT") machine, a peritoneal dialysis machine, a hemodialysis machine, a water purification machine, or a nutrition compounding machine.

In a 42nd bis aspect according to any one of the preceding aspects, the digital communication module (102) is configured to receive medical device data (303) from the medical device, a communication between the digital communication module (102) and the medical device being uni-directional.

In a 43rd aspect according to any one of the preceding aspects, the medical device data (303) includes at least one of:
- event information comprising transitions between fill, dwell, and drain phase of a dialysis cycle;
- alarm, alert, or event information;
- treatment programming information; or
- medical treatment data comprising at least one of an estimated fill rate, a drain rate, or an amount of ultrafiltration removed.

In a 44th aspect according to any one of the preceding aspects, the data manager (302) is further configured to:
- receive a configuration message via the output interface (306), the configuration message indicative of a network address of a clinician device and criteria for transmitting a notification to the clinician device;
- determine at least some of the medical device data (303) satisfies the criteria; and
- transmit a notification message to the clinician device via the proprietary network (400) that is indicative of the at least some of the medical device data (303) satisfying the criteria.

In a 45th aspect according to any one of the preceding aspects, medical system or module further includes at least one another medical device being an infusion pump, wherein medical device (104) is a dialysis machine,
- wherein the at least one other digital communication module (102A) is respectively associated with the infusion pump, and
- wherein the medical device data (303) from the dialysis machine includes a patient identifier and second medical device data (303) from the at least one infusion pump includes the same patient identifier and an infusion rate,
- the data manager (302) being further configured to:
- receive an indication that an adaptive fluid removal operation is enabled;
- receive parameter data that is related to the patient identifier including one or more of:
  - fresh dialysis fluid flow rate entering into a filtration unit,
  - effluent flow rate exiting from the filtration unit,
  - pre-infusion flow rate into an extracorporeal blood circuit,
  - post-infusion flow rate into an extracorporeal blood circuit,
  - a fluid removal target amount and a removal period,
  - a fluid removal rate,
- receive the second medical device data (303) from the at least one other digital communication module (102A) via the wireless proprietary network (400);
- determine if the at least one infusion pump is associated with the same patient identifier;
- determine an amount of fluid being infused into the patient or an infusion flow rate based on the second medical device data (303);
- determine updated parameter data based on the parameter data and the amount of fluid being infused into the patient or the infusion flow rate determined from the second medical device data (303), in particular the updated parameter maintaining unaltered a patient fluid balance during dialysis taking into account the fluid infused with the infusion pump;
- transmit the updated parameter data to the dialysis machine via the input interface (304).

In a 46th aspect according to the preceding aspect, the data manager (302) is further configured to:
- receive parameter data that is related to the patient identifier including:
  - either a fluid removal target amount and a removal period; or
  - a fluid removal rate for a patient that is related to the patient identifier;
- wherein the updated parameter data is at least one updated flow rate, such as the fluid removal rate, for the dialysis machine based on:
  - i) the fluid removal target and the removal period, or the fluid removal rate; and
  - ii) the amount of fluid being infused into the patient or the infusion flow rate;
- transmit the at least one updated flow rate, such as the updated fluid removal rate, to the dialysis machine via the input interface (304).

In a 46th aspect according to the previous aspect, wherein determining the at least one updated flow rate comprises recalculating one or more flow rates for the dialysis machine keeping the patient fluid balance unaltered, said one or more flow rates including one or more of fresh dialysis fluid flow rate entering into a filtration unit, effluent flow rate exiting from the filtration unit, pre-infusion flow rate into an extracorporeal blood circuit, post-infusion flow rate into an extracorporeal blood circuit, and fluid removal rate.

For example, either the pre-infusion flow rate or the post-infusion flow rate may be reduced of the same amount of the infusion flow rate from the infusion pump, thereby keeping all the other flow rates unaltered. Alternatively, the patient fluid removal rate may be increased of the same amount of the infusion flow rate from the infusion pump, thereby keeping all the other flow rates unaltered. Of course any other fluid change combinations may be used keeping the patient fluid balance unaltered.

In a 47th aspect according to the preceding aspect, the dialysis machine is a CRRT machine and the data manager (302) is configured to receive the fluid removal rate for a patient that is related to the patient identifier and to determine an updated fluid removal rate for the dialysis machine based on said fluid removal rate, and the amount of fluid being infused into the patient or the infusion flow rate.

In a 48th aspect according to any one of the preceding two aspects, the transmission of the updated fluid removal rate causes the dialysis machine to display a recommendation on a screen that is indicative of the updated fluid removal rate.

In a 49th aspect according to any one of the preceding three aspects, the transmission of the updated fluid removal rate causes the dialysis machine to automatically update a programmed treatment based on the updated fluid removal rate and the processor to drive the actuators to achieve the updated fluid removal rate.

In a 50th aspect according to any one of the preceding four aspects, the processor (107) of the dialysis machine is configured to compare the updated fluid removal rate with a maximum allowable fluid removal rate and to display an alert in case the updated fluid removal rate exceeds the maximum allowable fluid removal rate.

In a 51st aspect according to the preceding aspect, in case the updated fluid removal rate exceeds the maximum allowable fluid removal rate, the processor (107) recommend a fluid removal rate substantially equal to the maximum allowable fluid removal rate.

In a 52nd aspect according to any one of the preceding aspects, the data manager (302) is further configured to:
- receive sensor data from the EMR server (108) via the medical network (106); and transmit, via the input interface (304), the sensor data to the medical device (104) for display on a screen of the medical device (104).

In a 53$^{rd}$ aspect according to any one of the preceding aspects, the data manager (302) is further configured to:
compare the sensor data and at least some of the medical device data (303) to stored criteria; and
transmit, via the input interface (304), at least one recommendation message to the medical device (104) causing the screen to display information that is indicative of the comparison.

In a 54$^{th}$ aspect according to any one of the two preceding aspects, wherein sensor data from the EMR server (108) is transmitted to a mailbox (340) of the digital communication module (102), in particular sensor data from the EMR server (108) cannot be written directly to the medical device (104).

In a 55$^{th}$ aspect according to the preceding aspect, wherein the medical device manager (336) processes the sensor data in the mailbox to determine which data is to be transmitted to the medical device (104), in particular wherein the medical device manager (336) converts the data to a compatible format and transmits to the processor (107) of the medical device (104).

In a 56$^{th}$ aspect according to any one of the preceding aspects 53 to 55, wherein the data manager (302) is further configured:
to compare an id code of the sensor data identifying a patient with a patient identification contained in the medical device data transmitted by the medical device;
to transmit, via the input interface (304), the sensor data to the medical device (104) in case the id code and the patient identification identify a same patient.

The DCM disclosed herein is configured as a gateway (such as an Internet of Things ("IoT") gateway), which enables DCMs in a mesh-configuration to communicate with each other separately from a healthcare facility's medical network. As disclosed herein, the DCMs provide a self-contained network without the need for other networking components such as switches, routers, gateways, and/or access points. Such a self-contained configuration enables the DCMs to be deployed separately from and/or on top of an established medical network without any modification to the medical network. Such a self-contained configuration also enables the DCMs to be deployed at locations without established network infrastructure, such as rural or remote areas.

As disclosed herein, the DCMs are configured to provide a propriety communication network (e.g., a private personal area network). In some embodiments, the DCMs may implement the propriety communication network using wireless protocols such as Bluetooth®, Bluetooth® mesh, Bluetooth® low energy, Bluetooth® 5.0, Zigbee®, Z-Wave®, WeMo®, and/or LoRa (a low-power wide-area network ("LPWAN") network protocol). In other instances, the propriety communication network may use a protocol defined by a medical device manufacturer.

In certain embodiments, the DCM receives medical treatment data and/or medical event data (collectively referred to as medical device data herein) from a processor or therapy module of a medical device, such as a continuous renal replacement therapy ("CRRT") machine. The DCM transmits at least one stream of the medical device data to a medical network for inclusion in an appropriate EMR. The medical device data may be in a JavaScript Object Notation ("JSON") format, a HyperText Markup Language ("HTML") format, an Extensible Markup Language ("XML") format, a comma-separated values ("CSV") format, a text format, and/or a Health-Level-7 ("HL7") format.

In some embodiments, the DCMs of the medical devices are configured to communicate amongst each other over a propriety communication network that is separate from the hospital network. The DCMs may transmit ping messages to identify other DCMs within the propriety communication network. In some embodiments, the DCMs may designate one DCM as a node gateway that connects with a medical network. In those embodiments, the DCMs transmit medical device data to the designated node gateway DCM, which routes the received medical device data to the medical network. Such a configuration of DCMs provides a singular point of connectivity to a medical network, thereby improving security for the DCMs and reducing network complexity.

The interconnectivity of the DCMs disclosed herein provides enhanced operability for medical providers. In an example, the DCMs are configured to track usage of disposable and/or consumable items, such as filters, cassettes, line sets, dialysis solutions, renal replacement solutions, warmer bags, etc. The DCMs within the same proprietary communication network may share disposable and/or consumable usage information or provide such information to a designated node gateway DCM. At periodic intervals, one of the DCMs, such as the node gateway DCM, communicates the total usage information to a medical network and/or replenishment server.

It should be appreciated that the DCMs disclosed herein may be included within or connected to more than one type of medical device. In an example, one DCM may be connected to a CRRT machine while one or more DCMs are provided with infusion pumps. The example DCMs communicate over a propriety communication network to determine which are associated with or providing treatment to the same patient (using patient identifiers entered into the CRRT machine and infusion pumps). The DCMs next communicate medical device data amongst each other (or the DCMs of the infusion pumps communicate the data to the DCM of the CRRT machine), which provides a more comprehensive data-based picture of a patient's treatment. In one example, the DCM of the CRRT machine uses the infusion rate data from the infusion pumps for setting and/or changing a patient fluid removal rate to satisfy a programmed fluid removal target. In this configuration, the communication of the infusion data and modification of the patient's CRRT treatment occur outside a medical network, which enables such operability to be provided via a propriety communication network that is provided by compatible medical devices.

In another embodiment, an example DCM (connected to a CRRT machine) may be in communication with an EMR system of a medical facility via a medical network. Certain medical devices, such as a blood pressure monitor or a blood gas analyzer are configured to transmit measured data to the EMR system over the hospital network. The EMR system may transmit the measured data to the DCM. In some instances, the DCM causes the received data to be displayed at the CRRT machine. In other instances, the DCM is configured to analyze the received data in combination with data from the CRRT machine to determine a treatment recommendation, which is displayed on a monitor of the CRRT machine. In further instances, the DCM is configured to analyze the received data in combination with data from the CRRT machine to determine a treatment adjustment, which is then transmitted to the CRRT machine to adjust the ongoing treatment.

In a further embodiment, the example DCM (connected to or integrated with a CRRT machine) may be configured to provide indications of medical device data to a clinician device (e.g., a smartphone or a tablet computer) of a clinician. In this example, the clinician device may be wirelessly coupled to the DCM via a propriety communication network rather than through the hospital network. Through configuration, the DCM is provided a network or hardware address of the clinician device and an indication as to which information is to be transmitted. The DCM receives medical device data from a therapy processor of the CRRT machine and determines if any conditions are satisfied for transmitting a notification. The DCM is configured such that if at least one condition is satisfied, a notification message is transmitted, including information that is indicative of the medical device data, to the designated clinician device over the propriety communication network. Such a configuration enables a medical device provider, via the example DCM, to provide remote alerts and/or alarms directly to clinicians without adjusting or limiting operability for a medical network or relying on the medical network to route the alerts and/or alarms to the appropriate clinician.

In the above embodiment, the DCM may communicate with the clinician device via a first protocol, such as Bluetooth®, which is provided in many mobile devices. Further, the DCM may communicate with other DCMs using another protocol and/or a proprietary protocol, which is not common in mobile devices. Such a configuration enables integration of DCMs communicating over a proprietary network with mobile devices that have relatively more limited transceivers (options) for wireless communication.

The example DCM is able to be operated with any type of medical device or machine that is applicable, for example, to fluid delivery for plasmapherisis, hemodialysis ("HD"), hemofiltration ("HF") hemodiafiltration ("HDF"), and continuous renal replacement therapy ("CRRT") treatments. The DCM described herein is also applicable to peritoneal dialysis ("PD"), intravenous drug delivery, and nutritional fluid delivery. The above different treatment modalities and associated devices may be referred to herein collectively or generally individually as medical fluid delivery or treatment and associated devices or machines.

The above modalities may be provided by a medical fluid delivery machine that houses components needed to deliver medical fluid, such as one or more pumps, valves, heaters if needed, online medical fluid generation equipment if needed, sensors, such as any one, or more, or all of pressure sensors, conductivity sensors, temperature sensors, air detectors, blood leak detectors, and the like, user interfaces, and control units, which may employ one or more processors and memory to control the above-described equipment. The medical fluid delivery machine may also include one or more filter, such as a dialyzer or hemofilter, for cleansing blood and/or an ultrafilter for purifying water, dialysis fluid, or other treatment fluid.

The DCM and the medical fluid delivery machine described herein may be used with home-based machines. For example, the systems may be used with home HD, HF, HDF or PD machines, which are operated at the patient's convenience. One such home system is described in U.S. Pat. No. 8,029,454 ("the '454 patent"), issued Oct. 4, 2011, entitled "High Convection Home Hemodialysis/Hemofiltration And Sorbent System", filed Nov. 4, 2004, assigned to the assignees of the present application. Other such home systems are described in U.S. Pat. No. 8,393,690 ("the '690 patent"), issued Mar. 12, 2013, entitled "Enclosure for a Portable Hemodialysis System", filed Aug. 27, 2008. The entire contents of each of the above references are incorporated herein by reference and relied upon.

As described in detail below, the DCM of the present disclosure may operate within an encompassing medical network that may include many machines comprising many different types of devices, patients, clinicians, doctors, service personnel, electronic medical records ("EMR") databases, a website, a resource planning system handling data generated via the patient and clinician communications, and business intelligence. The DCM of the present disclosure operates seamlessly within the medical network and without contravening the network's rules and protocols.

In light of the present disclosure and the above aspects, it is therefore an advantage of the present disclosure to provide a self-contained proprietary wireless network hosted by digital communication modules (e.g., IoT gateways) that are associated with medical devices.

It is another advantage of the present disclosure to use the self-contained network for transmitting medical device data and/or consumable/disposable usage data among digital communication modules for single-point transmission to a medical network.

It is further advantage of the present disclosure to use a digital communication module for edge-computing regarding decision support for CRRT machines.

It is yet another advantage of the present disclosure to provide a system that provides wireless alert, alarms, or other notifications from a medical device directly to mobile clinician devices.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Figure 1:
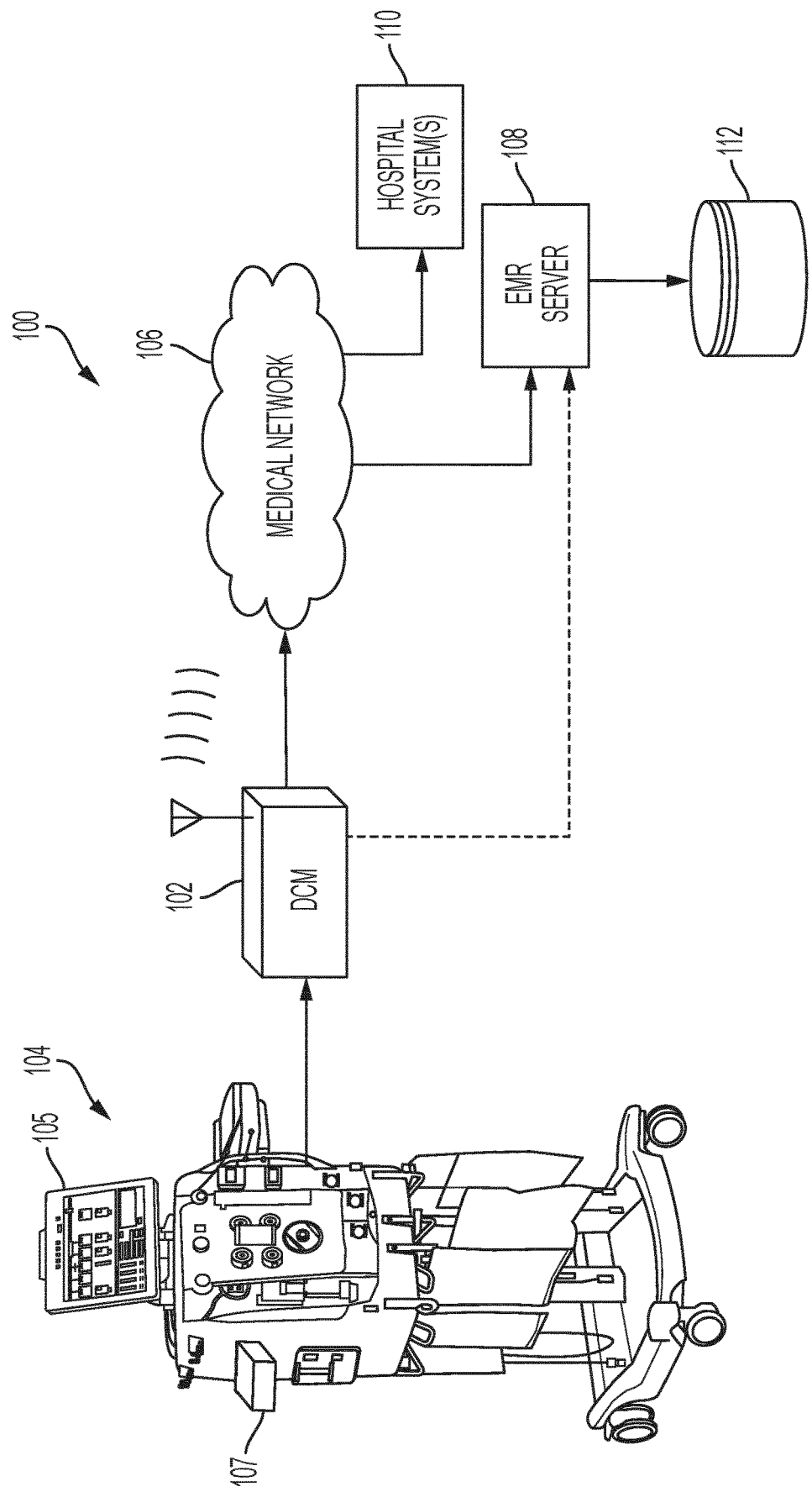
FIG. 1 is a diagram of a DCM environment including a DCM and medical device, according to an example embodiment of the present disclosure.

Methods, systems, and apparatus are disclosed herein for hosting or otherwise providing a propriety wireless communication network separate from a medical network. The methods, systems, and apparatus are implemented in one embodiment through a digital communication module ("DCM"), such as a gateway. The example DCM disclosed herein may be integrated within a medical device or be provided separately from a medical device. In either configuration, the DCM is configured to receive medical device data from a medical device. The DCM transmits the medical device data to a hospital network for storage in a patient record that is managed by an EMR server.

The example DCM is provided via a configuration file and/or a configuration routine that specifies input interface parameters, output interface parameters, device driver parameters, and/or data conversion parameters. The configuration file and/or a configuration routine also defines how the DCM is to communicate with other DCMs that are within a propriety wireless communication network. Together, DCMs of the same propriety wireless communication network may form a mesh network in which the network is self-contained and hosted exclusively by the DCMs without usage of hospital network infrastructure.

The DCM is configured to operate with many different types of medical devices and communicate via different types of interfaces, such as a serial connection (e.g., an RS-232 or RS-485 connection), an Ethernet connection, a Wi-Fi connection, a Bluetooth® connection, a universal serial bus ("USB") connection, or any other wireless connection disclosed herein. The configurability of the DCM enables its use with many different types of medical devices, such as a peritoneal dialysis machine, a critical care dialysis machine, a continuous renal replacement therapy ("CRRT") machine, a hemodialysis machine, a water preparation/purification device, a nutrition compounding machine, an infusion pump, etc. Further, the configurability of the DCM enables its use within differently configured hospital systems. The configurability of the DCM accordingly enables medical device data to be transmitted to a medical network without having to make connectivity or networking changes to medical devices or hospital systems.

Reference is made herein to medical device data. As disclosed herein, medical device data is generated at a medical device and transmitted to the DCM. The medical device data includes treatment programming information. Treatment programming information includes one or more parameter that define how a medical device is to operate to administer a treatment to a patient. For a CRRT therapy, the parameters may specify a flow rate of fresh dialysis fluid, a total flow volume (or volume per bag) of dialysis fluid, a dialysis fluid concentration of one or more substances, a desired dialysis dose, particularly in terms of flow rate (such as effluent flow rate, urea clearance, etc. . . .), a total number of fresh dialysis bags connected to a CRRT medical device, a target UF removal, a blood flow rate, a total number of drain bags connected, hemofilter or dialyzer information, a replacement fluid volume and/or flow rate, and/or an amount (and/or rate) of heparin or other pharmaceutical/additive that is to be added to a patient's recirculated blood.

For a peritoneal dialysis therapy, the parameters may specify an amount (or rate) of fresh dialysis fluid to be pumped into a peritoneal cavity of a patient, an amount of time the fluid is to remain in the patient's peritoneal cavity (i.e., a dwell time), and an amount (or rate) of used dialysis fluid and ultrafiltration ("UF") that is to be pumped or drained from the patient after the dwell period expires. For a treatment with multiple cycles, the parameters may specify the fill, dwell, and drain amounts for each cycle and the total number of cycles to be performed during the course of a treatment (where one treatment is provided per day or separate treatments are provided during the daytime and during nighttime). In addition, the parameters may specify dates/times/days (e.g., a schedule) in which treatments are to be administered by the medical fluid delivery machine. Further, parameters of a prescribed therapy may specify a total volume of dialysis fluid to be administered for each treatment in addition to a concentration level of the dialysis fluid, such as a dextrose level. For an infusion therapy, the parameters may include a volume to be infused, a medication to be infused, a medication concentration, a medication dosage, and/or an infusion rate.

The medical device data also includes event information that relates to administration of the treatment. The event information may include data generated by a medical device that is indicative of measured, detected, or determined parameter values. For example, while a prescribed therapy may specify that a treatment is to comprise five separate cycles, each with a forty-five minute dwell time, a medical fluid delivery device may administer a treatment where fewer cycles are provided, each with a thirty minute dwell time. The medical device monitors how the treatment is administered and accordingly provides parameters that are indicative of the operation. The parameters for the treatment data may include, for example, a total amount of dialysis fluid administered to the patient, blood flowrate, dialysis fluid flowrate, dialysis dose, replacement fluid flow rate, used dialysis fluid for effluent flowrate, anticoagulant, e.g., citrate or heparin flowrate, calcium flowrate, dialysis fluid temperature, an intravenous drug flowrate, a number of cycles operated, a fill amount per cycle, a dwell time per cycle, a drain time/amount per cycle, an estimated amount of UF removed, a treatment start time/date, and/or a treatment end time/date. The treatment data may be prescribed or calculated, for example, such as a fill rate and a drain rate, determined by dividing the amount of fluid pumped by the time spent pumping. The treatment/event data may further include an identification of an alarm that occurred during a treatment, a duration of the alarm, a time of the alarm, an event associated with the alarm, and/or an indication as to whether the issue that caused the alarm was resolved or whether the alarm was silenced.

The medical device data further includes device machine logs that include diagnostic information, fault information, etc. The diagnostic information may include information indicative of internal operations of a medical device, such as faults related to pump operation, signal errors, communication errors, software issues, etc. The medical device data may be transmitted as a data stream or provided at periodic intervals. In some instances, the medical device data may be transmitted as events or other changes to the data occur.

Reference is also made herein to log data that is generated by the example DCM disclosed herein. The log data includes an identification of a therapy device type, identification of a therapy device serial number, a timestamp from which the treatment data is generated or received from the therapy device, an identifier of the DCM, a timestamp for the snapshot, and/or a DCM monotonic timestamp.

I. DCM ENVIRONMENT EMBODIMENT

FIG. 1 shows a diagram of a DCM environment 100, according to an example embodiment of the present disclosure. The example DCM environment 100 includes at least one DCM 102 communicatively coupled to a medical device 104. The DCM 102 may be connected to the medical device 104 via a serial connection, an Ethernet connection, a USB connection, a Wi-Fi connection, a Bluetooth® connection, etc. The example DCM 102 may include a network gateway, such as an IoT gateway.

In the example embodiment, DCM 102 is configured to receive medical device data from the medical device 104. This uni-directional communication configuration prevents another device from being able to access, program, or otherwise communicate with the medical device 104 via the DCM 102. However, in some embodiments, the DCM 102 may have a bi-directional communication link with the medical device 104 to enable data, programming instructions, or information to be transmitted to the medical device. While only one DCM 102 and medical device 104 are shown in FIG. 1, it should be appreciated that the environment 100 may include tens to hundreds or thousands of medical devices and respective DCMs that form a proprietary wireless communication network.

The example medical device 104 is configured to accept one or more parameter specifying a treatment or prescription (i.e., treatment programming information). During operation, the medical device 104 writes event, diagnostic, and/or operational data to one or more log files. In some embodiments, the medical device 104 may store medical device data to a log file periodically, such as every five seconds to sixty seconds and/or after there is a change in data. The new medical device data written to the log file is transmitted to the DCM 102. In some embodiments, the medical device creates the medical device data in a JavaScript Object Notation ("JSON"), an HyperText Markup Language ("HTML") format, an Extensible Markup Language ("XML") format, a comma-separated values ("CSV") format, a text format, and/or a Health-Level-7 ("HL7").

The example medical device 104 may include one or more control interfaces 105 for displaying instructions and receiving control inputs from a user. The control interface 105 may include buttons, a control panel, or a touchscreen. The control interface 105 may also be configured to enable a user to navigate to a certain window or user interface on a screen of the medical device 104. The control interface 105 may also provide instructions for operating or controlling the medical device 104.

The example medical device 104 also includes a processor or therapy module 107. The processor or therapy module 107 of the medical device 104 operates according to one or more instructions for performing a treatment on a patient. The instructions may be acquired via the control interface 105. The processor or therapy module 107 also monitors devices components for issues, which are documented as diagnostic information. The processor or therapy module 107 creates medical device data in combination with operating one or more pump or other component to administer the treatment. The processor therapy module 107 transmits the medical device data to the DCM 102.

The example DCM environment 100 also includes a medical network 106, which communicatively couples the DCM 102 to an EMR server 108 and one or more hospital systems 110. The medical network 106 can include any number of gateways, routers, system hubs, switches, and/or network appliances for establishing communication connections and routing data. The medical network 106 may include one or more firewalls that restrict access to only authorized remote devices and/or servers. The medical network 106 may include any local area network ("LAN"), wireless LAN ("WLAN"), Ethernet network, Wi-Fi network, or combinations thereof.

As shown in FIG. 1, the DCM 102 may be wired or wirelessly coupled to the medical network 106. In some embodiments, the connection may include an Ethernet connection, a Wi-Fi connection, and/or a cellular connection. Additionally or alternatively, the DCM 102 may have a serial connection to the EMR server 108 (or the hospital system 110) that bypasses the medical network 106.

Figure 2:
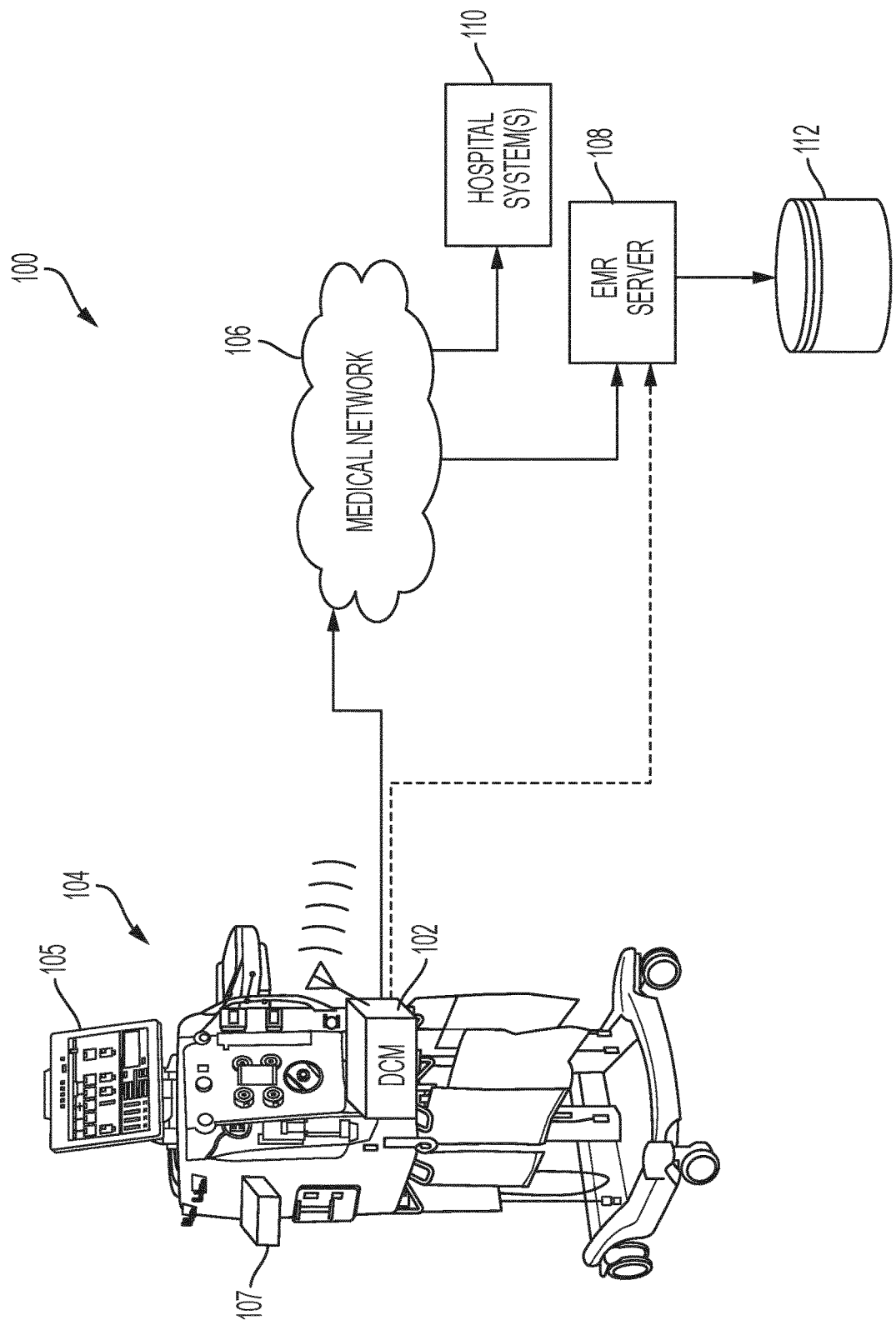
FIG. 2 is another diagram of the DCM environment, according to an example embodiment of the present disclosure.

FIG. 2 shows another diagram of the DCM environment 100, according to an example embodiment of the present disclosure. In this embodiment, the DCM 102 is included within and/or integrated with the medical device 104. The DCM 102 may include, for example, a Digi ConnectCore® 6UL module, which has a NXP i.MX6UL-2, Cortex-A7 528 MHz CPU and 256 MB/1 GB NAND and DDR3 flash drives. The DCM 102 may be connected to a communication bus of the medical device 104 for receiving medical device data. The DCM 102 (including the DCM of FIG. 1) also includes an 802.11a/b/g/n/ac Wi-Fi radio and/or a Bluetooth® 4.2 radio. The DCM 102 may include a Yocto Linux operating system and contains drivers for the Digi chipset.

The example EMR server 108 of FIGS. 1 and 2 is configured to manage patient EMRs that are stored in a database of a memory device 112. The EMR server 108 is configured to receive medical device data, parse the data based on patient identifier, locate corresponding patient EMRs in the memory device 112, and store the parsed medical device data to the identified EMR. The EMR server 108 may also access one or more EMR in response to request messages that identify the respective patients. The EMR server 108 may store the medical device data in a HL7 format, a binary version 2 format, a binary version 3 format, or a Fast Healthcare Interoperability Resources ("FHIR") format.

The example hospital system 100 may include any of a service portal, an enterprise resource planning system, a web portal, a business intelligence portal, a HIPAA compliant database, a pharmacy system, etc. The hospital system 100 may also include a middleware system and/or an integration engine. The hospital system 100 enables user devices (e.g., smartphones, laptop computers, workstations, tablet computers, etc.) to read and/or write to the medical device data stored in the EMRs of the memory device 112.

In the illustrated example, the medical device 104 is the PrisMax™ CRRT machine manufactured by Baxter International Inc. It should be appreciated that in other embodiments, the medical device 104 may include any other renal failure therapy machine, infusion pump, physiological sensor, etc. The medical device 104 may include, for example, an infusion pump (e.g., a syringe pump, a linear peristaltic pump, a large volume pump ("LVP"), an ambulatory pump, multi-channel pump), a nutritional compounding machine, an oxygen sensor, a respiratory monitor, a glucose meter, a blood pressure monitor, an electrocardiogram ("ECG") monitor, a weight scale, and/or a heart rate monitor.

Regarding renal failure therapy machines, due to various causes, a patient's renal system can fail. Renal failure produces several physiological derangements. For instance, a patient experiencing renal failure can no longer balance water and minerals or excrete daily metabolic load. Toxic end products of nitrogen metabolism (urea, creatinine, uric acid, and others) can accumulate in the patient's blood and tissue. Kidney failure and reduced kidney function have been treated with dialysis. Dialysis removes waste, toxins and excess water from the body that normal functioning kidneys would otherwise remove. Dialysis treatment for replacement of kidney functions is critical to many people because the treatment is life saving.

One type of kidney failure therapy is Hemodialysis ("HD"), which in general uses diffusion to remove waste products from a patient's blood. A diffusive gradient occurs across the semi-permeable dialyzer between the blood and an electrolyte solution called dialysate or dialysis fluid to cause diffusion.

Hemofiltration ("HF") is an alternative renal replacement therapy that relies on a convective transport of toxins from the patient's blood. HF is accomplished by adding substitution or replacement fluid to the extracorporeal circuit during treatment (typically ten to ninety liters of such fluid). The substitution fluid and the fluid accumulated by the patient in between treatments is ultrafiltered over the course of the HF treatment, providing a convective transport mechanism that is particularly beneficial in removing middle and large molecules (in hemodialysis there is a small amount of waste removed along with the fluid gained between dialysis sessions, however, the solute drag from the removal of that ultrafiltrate is not enough to provide convective clearance).

Hemodiafiltration ("HDF") is a treatment modality that combines convective and diffusive clearances. HDF uses dialysis fluid flowing through a dialyzer, similar to standard hemodialysis, to provide diffusive clearance. In addition, substitution solution is provided directly to the extracorporeal circuit, providing convective clearance.

Another type of kidney failure therapy is peritoneal dialysis, which infuses a dialysis solution, also called dialysis fluid, into a patient's peritoneal cavity via a catheter. The dialysis fluid contacts the peritoneal membrane of the peritoneal cavity. Waste, toxins and excess water pass from the patient's bloodstream, through the peritoneal membrane and into the dialysis fluid due to diffusion and osmosis, i.e., an osmotic gradient occurs across the membrane. An osmotic agent in dialysis provides the osmotic gradient. The used or spent dialysis fluid is drained from the patient, removing waste, toxins and excess water from the patient. This cycle is repeated, e.g., multiple times.

There are various types of peritoneal dialysis therapies, including continuous ambulatory peritoneal dialysis ("CAPD"), automated peritoneal dialysis ("APD"), and tidal flow dialysis and continuous flow peritoneal dialysis ("CFPD"). CAPD is a manual dialysis treatment. Here, the patient manually connects an implanted catheter to a drain to allow used or spent dialysate fluid to drain from the peritoneal cavity. The patient then connects the catheter to a bag of fresh dialysis fluid to infuse fresh dialysis fluid through the catheter and into the patient. The patient disconnects the catheter from the fresh dialysis fluid bag and allows the dialysis fluid to dwell within the peritoneal cavity, wherein the transfer of waste, toxins and excess water takes place. After a dwell period, the patient repeats the manual dialysis procedure, for example, four times per day, each treatment lasting about an hour. Manual peritoneal dialysis requires a significant amount of time and effort from the patient, leaving ample room for improvement.

Automated peritoneal dialysis ("APD") is similar to CAPD in that the dialysis treatment includes drain, fill and dwell cycles. APD machines, however, perform the cycles automatically, typically while the patient sleeps. APD machines free patients from having to perform the treatment cycles manually and from having to transport supplies during the day. APD machines connect fluidly to an implanted catheter, to a source or bag of fresh dialysis fluid and to a fluid drain. APD machines pump fresh dialysis fluid from a dialysis fluid source, through the catheter and into the patient's peritoneal cavity. APD machines also allow for the dialysis fluid to dwell within the cavity and for the transfer of waste, toxins and excess water to take place. The source may include multiple sterile dialysis fluid bags.

APD machines pump used or spent dialysate from the peritoneal cavity, though the catheter, and to the drain. As with the manual process, several drain, fill and dwell cycles occur during dialysis. A "last fill" occurs at the end of APD and remains in the peritoneal cavity of the patient until the next treatment.

The present system and associated methodology are applicable to any of the above renal failure therapy modalities.

II. DCM EMBODIMENT

Figure 3:
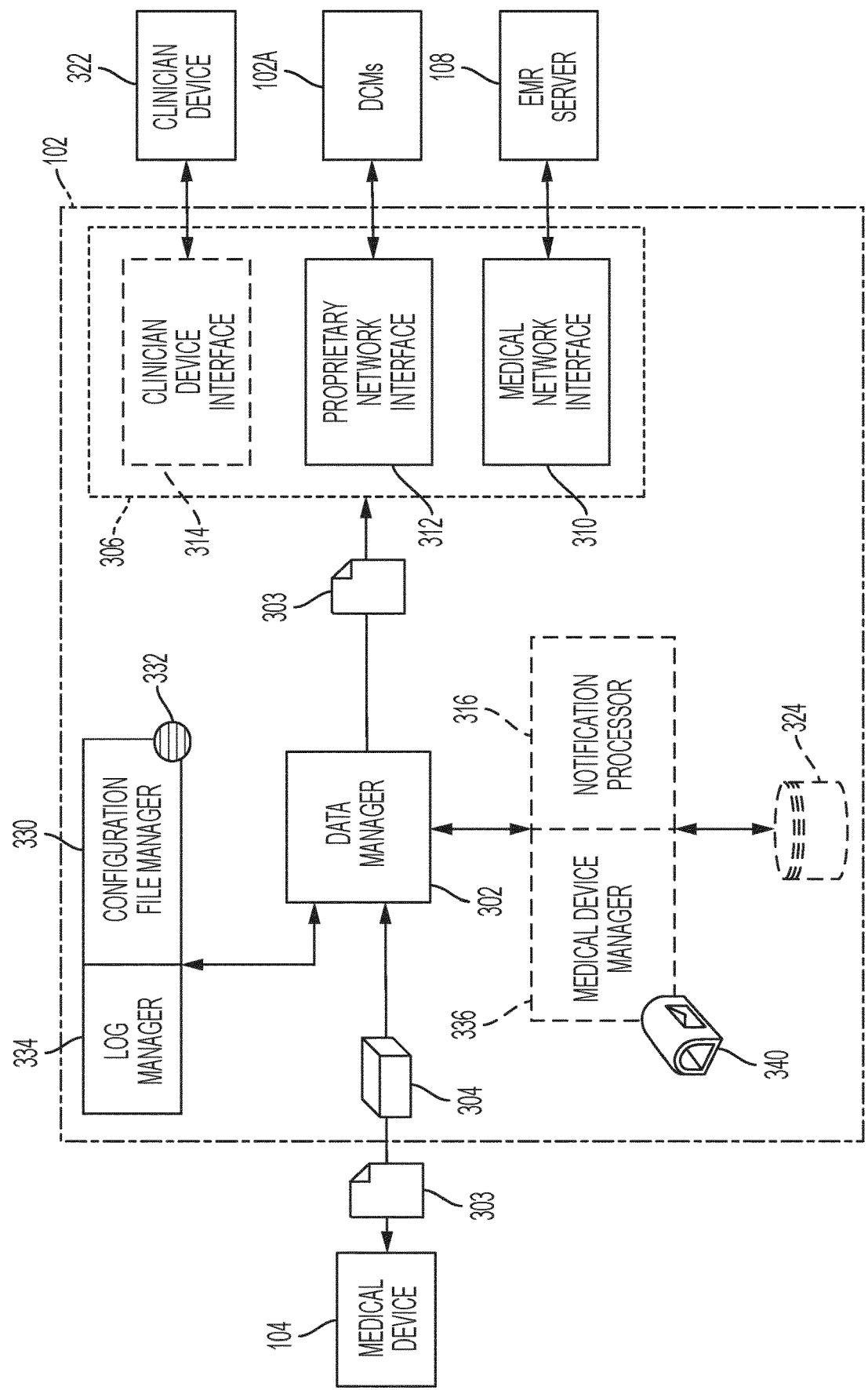
FIG. 3 is a diagram of the example DCM of FIGS. 1 and 2, according to an example embodiment of the present disclosure.

FIG. 3 shows a diagram of the example DCM 102 of FIGS. 1 and 2, according to an example embodiment of the present disclosure. The example DCM 102 includes a data manager 302 and an input interface 304 for communicatively coupling with a medical device 104. The input interface 304 may include at least one of a serial input port, an Ethernet port, and/or a wireless input port. The input interface 304 may include a wired or wireless transceiver for communication with the medical device 104. In some embodiments where the DCM 102 is integrated within the medical device 104, the input interface 304 may connect to a data bus or output connector on a PCB board of the medical device 104.

The input interface 304 is configured to receive medical device data 303 from the medical device, which is routed to the data manager 302. In some embodiments, as discussed below, the input interface 304 may also be configured to transmit information for display on a screen or control interface 105 of the medical device 104. Additionally or alternatively, the input interface 304 may transmit instructions for changing treatment parameters or treatment control provided by the therapy module 107 of the medical device 104.

The example data manager 302 is configured to route the medical device data 302 to an appropriate port of an output interface 306. The routing depends on a configuration of the DCM 102. For example, the output interface 306 includes a medical network interface 310 for instances where medical device data 303 is to be routed to the EMR server 108 via the medical network 106. The medical network interface 310 may include a wired and/or wireless Ethernet transceiver, a Wi-Fi transceiver, and/or a serial transceiver for an RS-232 or RS-485 connection to the medical network 106. The data manager 302 is configured to select the medical network interface 310 in instances where the medical device data 303 is to be routed directly to the EMR server 108 rather than through other DCMs 102A via a proprietary communication network.

The example output interface 306 includes a proprietary network interface 312 for routing medical device data 303 over a proprietary communication network to other DCMs 102A. The proprietary network interface 312 may include a transceiver configured for communication via at least one of Bluetooth®, Bluetooth® mesh, Bluetooth® low energy, Bluetooth® 5.0, Zigbee®, Z-Wave®, WeMo®, and/or LoRa. The proprietary network interface 312 is configured to enable DCMs within a communication range of each other to form a proprietary communication network that is separate from the medical network 106 shown in FIGS. 1 and 2. The data manager 302 selects the proprietary network interface 312 for transmission of medical device data 303 when conditions and/or configurations dictate that the data is to be transmitted to another medical device/DCM 102A, as discussed in more detail below in connection with at least FIGS. 4 to 11.

The example output interface 306, in some embodiments, includes a clinician device interface 314, which enables medical device data 303 (and/or notifications from a notification processor 316) to be transmitted to a clinician device 322. The clinician device interface 314 may include a transceiver configured for communication via at least one of Bluetooth®, Bluetooth® mesh, Bluetooth® low energy, Bluetooth® 5.0, Zigbee®, and/or any other wireless protocol that is supported by clinician devices 322 (or hardware attachments (such as a Zigbee® transceiver that interfaces with a USB or Lightening port) to clinician devices). The data manager 302 selects the clinician device interface 314 for medical device data 303 and/or notifications for a clinician device 322.

The output interface 306 includes the clinician device interface 314 if communications with clinician devices are desired but the proprietary communication network with other DCMs 102A is provided over a wireless network protocol that is not supported by clinician devices. In such an arrangement, the data manager 302 uses the proprietary network interface 312 for communication among DCMs 102A over the proprietary communication network while communications with clinician devices 322 are provided via the clinician device interface 314. In some embodiments, the clinician device interface 314 is omitted if communications with clinician devices 322 are not supported by the DCM 102 or not needed. Additionally, the clinician device interface 314 is omitted if communication with clinician devices may occur via the proprietary network interface 312. For instance, the proprietary communication network may implement a Bluetooth® protocol, which is supported by known clinician devices 322. Under this configuration, the clinician devices 322 are made a part of the proprietary communication network that is hosted by the DCM 102 and the other DCMs 102A.

As mentioned above, the DCM 102 of FIG. 3 includes a notification processor 316, which is communicatively coupled to the data manager and a database 324. The example notification processor 316 is configured to generate event and/or alarm notifications for clinician devices 322. The example notification processor 316 compares medical device data 303 received from the medical device 104 to one or more criteria stored in the database 324. If at least one criterion is a match, the notification processor 316 creates a notification message for the appropriate clinician device 322. As described in more detail below, a clinician may use the clinician device 322 to access the notification processor 316, which may include one or more APIs to a template notification form in the database 324. The template notification form includes options for selecting criteria for receiving notification messages. The criteria may include, for example, a patient identifier, event conditions (such as drain bag low, medical device paused), alarm conditions (such as line occlusion), and/or alert conditions (such as treatment ending or UF removed trending downward). The criteria may also include options for selecting medical device data 303 for transmission to the clinician device 322 (such as dialysis parameters) and/or how much context information is needed for display in conjunction with an alarm/alert/event notification. Selection of the criteria via the template causes the notification processor 316 to create logic, conditions, and/or thresholds, for comparison to medical device data 303. The logic, conditions, and/or thresholds are stored in a criteria file in the database 324 and associated with a destination network address, hardware address, and/or identifier of the clinician device 322. After the criteria file is created, the notification processor accesses the file in the database 324 to determine when notification messages are to be generated and the information for inclusion in the messages.

The example DCM 102 also includes a file configuration manager 330 that enables routing of the medical device data 303 to be specified. The file configuration manager 330 stores at least one configuration file 332. In some embodiments, the file configuration manager 330 receives the configuration file 332 via the medical network interface 310 from a computer connected to the medical network 106 and/or from other DCMs 102A via the proprietary network interface 312.

The configuration manager 330 reads the configuration file 332 and configures a log manager 334, a medical device manager 336, the notification processor 316, the data manager 302, and/or the output interface 306 accordingly. For the log manager 334, this may include reading the configuration file 332 for a DCM identifier, medical device type, medical device identifier, etc., which are written to registers, parameters/or variables of the log manager 334.

For the data manager 302 and the output interface 306, this may include reading the configuration file 330 to determine which network interfaces 310 to 314 are to receive medical device data 303. In an example, the configuration file 332 may specify that medical device data 303 is to be routed to the medical network interface 310 because, for example, the DCM 102 is designated as a node gateway or node for routing medical device data to the EMR server 108. In another example, the configuration file 332 may specify that the medical device data 303 is to be routed to the proprietary network interface 312 because another DCM 102A is the node gateway. In this example, the configuration file 332 may include an identifier, network address, and/or hardware address of the recipient DCM 102A. In these examples, the configuration file manager 330 may determine which of the other DCMs 102A are to receive the medical device data 303 based on a specified order, which may correspond to a date/time of activation or robustness of a connection to the medical network 106. The log manager 334 may determine a date/time when the DCM 102 is activated or otherwise turned on (or the medical device 104 is activated), which is stored to the configuration file 332 to enable the configuration file manager 330 to determine which network interface 310 or 312 is to receive medical device data 303.

In these examples, the configuration file manager 330 is configured for at least partially hosting the proprietary network interface 312. The configuration file manager 330, via parameters of the configuration file 332, may specify conditions for connecting the DCM 102 to other DCMs 102A in a proprietary communication network, including node identification broadcast messages, handshake messages, cross-network configuration messages, deactivation messages, and/or networking protocols specifying, for example, parameters for a designated node gateway, message time out durations, network failover conditions, transmission/reception channel/frequency/sub-frequency, and/or data rate. The information in the configuration file 332 specifies parameters and protocols for the proprietary communication network that is established and hosted by the DCM 102 and the other DCMs 102A.

In some instances, the configuration file manager 330 may also specify a conversion file type for the network interfaces 310 to 314. Further, the configuration file manager 330 configures the data manager 302 based on a duration between snapshots, types of medical device data to be included in the separate streams and/or subsets and/or a type of data that is to be received from the medical device 104 (e.g., JSON data, HTML data, binary data, HL7 data, XML data, etc.). The configuration file manager 330 also reads the configuration file 332 to specify network credentials, authentication information, encryption keys, API identifiers, destination IP addresses, etc. for the network interfaces 310 to 314.

The example log manager 334 of FIG. 3 creates and/or manages log data. As disclosed herein, the log data may include information that is indicative of the medical device 104, such as an identification of a medical device type, identification of a medical device serial number, a timestamp from which the medical device data 303 was generated or received from the medical device 104, an identifier of the DCM 102, a timestamp for the snapshot (disclosed below) created by the device data manager 302, and a DCM monotonic timestamp. The identification of a medical device type, identification of a medical device serial number, and identifier of the DCM 102 may be specified in the configuration file 332. In some instances, the identification of a medical device type and the identification of a medical device serial number may be reported by the medical device 104. The log manager 334 is configured to store this information and create the appropriate timestamps as the medical device data 303 is received and/or the snapshots are created. The log manager 334 may then transmit at least some of the log data to the data manager 302 for inclusion with the medical device data 303 routed to the designated interface 310 to 314.

In some embodiments, the example data manager 302 is configured to create a snapshot of the medical device data 303 at discrete points of time instead of processing/transmitting a continuous stream of medical device data. The time periods may be specified by the configuration file 332 and include, for example, five second intervals, ten second intervals, thirty second intervals, sixty second intervals, etc. For each snapshot the data manager 302 reads the most recent received data from the medical device 104. In this manner, the data manager 302 provides periodic updates regarding a status of the medical device 104.

In an example, the medical device 104 may transmit medical device data 303 in a continuous stream, periodic intervals, or after changes to the data. The medical device 104 may transmit the medical device data 303 in a medical device log file or a stream of messages. The data manager 302 compiles the received data since the last snapshot interval. When the next interval approaches, the data manager 302 compiles the most recent data of the compilation into the snapshot to provide a representation of the medical device 104 at that point in time. If multiple events occur during a compilation period, the data manager 302 may include only the most recent event or all of the events that occurred during the time period.

In some instances, the data manager 302 may compare a current snapshot to a previous snapshot. Based on the comparison, the data manager 302 may only include medical device data that has changed since the previous snapshot in the current snapshot. The comparison reduces the amount of data transmitted in each snapshot such that only new and/or updated medical device data 303 is communicated. For example, a CRRT medical device 104 may continuously transmit an estimated UF removed value, dialysis fluid delivered, replacement fluid delivered and/or effluent fluid removed. As such, the data manager 302 only includes the UF removed value when there are changes to the value. In another example, an alarm may activate at a certain time. A device status may be included in the medical device data 303 indicating that the alarm is still active. However, the data manager 302 only includes a notice in a first snapshot of a time the alarm activate (and a an alarm type) and a time the alarm was silenced or reset in a second subsequent snapshot, without including indications that the alarm was active in the intermediate snapshots.

In other embodiments, the medical device 104 may selectively only transmit medical device data that has changed from previous values or reflect a new event. In such instances, the data manager 302 writes the received medical device data 303 to the appropriate snapshot.

The data manager 302 is configured such that after combining any log data with the medical device data 303, the data is formatted into a data format compatible with or needed by the EMR server 108, the other DCMs 102A, and/or the clinician device 322. In other words, the data manager 302 creates a conversion of medical device data 303 and/or the log data. The conversion type may be specified by the configuration file 332. The conversion may be, from, for example, JSON to HL7, binary, and/or FHIR. The data manager 302 may include one or more files and/or algorithms that specifies how, for example, medical data 303 and/or the log data in a JSON, XML, HTTP, or HTML format is to be converted into HL7, binary v2, binary v3, and/or FHIR. The file and/or algorithm may identify JSON data by position, data label, field name, and/or metadata and specify how the data is to be converted, including conversion of data label names, metadata names, numeric format, positioning, etc. The data manager 302 then transmits the converted data to the designated interface 310 to 314.

In some embodiments, the DCM 102 is enabled for two-way communication with the medical device 104. The example medical device manager 336 of the DCM 102 is configured to process data and/or information for transmission to the medical device 104. The medical device manager 336 includes, for example, a mailbox 340 that enables external data or information to be written to the DCM 102 for transmission to the medical device 104. In other words, data from the EMR server 108 (or other DCMs 102A) is not written directly to the medical device 104. Rather, the data is written or transmitted to the mailbox 340. The example medical device manager 336 processes the information in the mailbox 340 to determine which data or information is to be transmitted to the medical device 104. In some embodiments, the mailbox 340 and/or criteria for transmitting to the medical device 104 are stored in the database 324.

In an embodiment, the medical device manager 336 receives from the EMR server 108 sensor data or lab data that is related to a patient being treated by the medical device 104. In some embodiments, the EMR server 108 may transmit the data to the medical network interface 310. In other embodiments, the data is received in the DCM 102 from the other DCMs 102A of the proprietary communication network (where one of the DCMs is connected to the EMR server 108 via the medical network 106). The data is transmitted to the mailbox 340. The medical device manager 336 compares the received data to criteria specified in the database 324. In one instance, the medical device manager 336 determines that the received data meets criteria for transmitting the data itself to the medical device. Accordingly, the medical device manager 336 converts the data to the appropriate format and transmits to the therapy module 107 of the medical device 104 via the input interface 304, which causes the therapy module 107 to display the data on the control interface 105. In other instances, the medical device manager 336 compares the received data (including any relevant medical device data 303) to one or more conditions specified in the database 324 for determining recommendations for the medical device. The medical device manager 336 transmits one or more messages with the recommendations to the medical device 104 for display. The recommendation may specify a recommended change to a dialysis treatment, such as increasing a dwell time or changing a dextrose concentration of dialysis fluid. In yet other instances, the medical device manager 336 determines a treatment adjustment using the received data (including any relevant medical device data 303) and one or more condition specified in the database 324. The medical device manager 336 transmits one or more messages with the treatment adjustments to the therapy module 107 of the medical device to change or modify a current or future treatment (such as converting from a non-tidal to a tidal therapy, increasing a fill, dwell, or drain time, increasing/decreasing a fluid removal rate, etc.).

In the subsequent sections, reference is made to operations performed by components 302, 304, 306, 310, 312, 314, 316, 330, 334, and 336 of the DCM 102. The example operations performed by components 302, 304, 306, 310, 312, 314, 316, 330, 334, and 336 of the DCM 102 may be implemented using one or more computer program and/or application. The programs or the applications may be defined by a series of computer instructions that are stored on any computer-readable medium, including random access memory ("RAM"), read only memory ("ROM"), flash memory, magnetic or optical disks, optical memory, or other storage media. The instructions may be configured to be executed by a processor of the DCM 102, which when executing the series of computer instructions performs or facilitates the performance of all or part of the disclosed methods and procedures disclosed herein. The persistent storage device or database 324 may include any memory device including RAM, ROM, flash memory, etc.

III. EXAMPLE PROPRIETARY COMMUNICATION NETWORK EMBODIMENT

Figure 4:
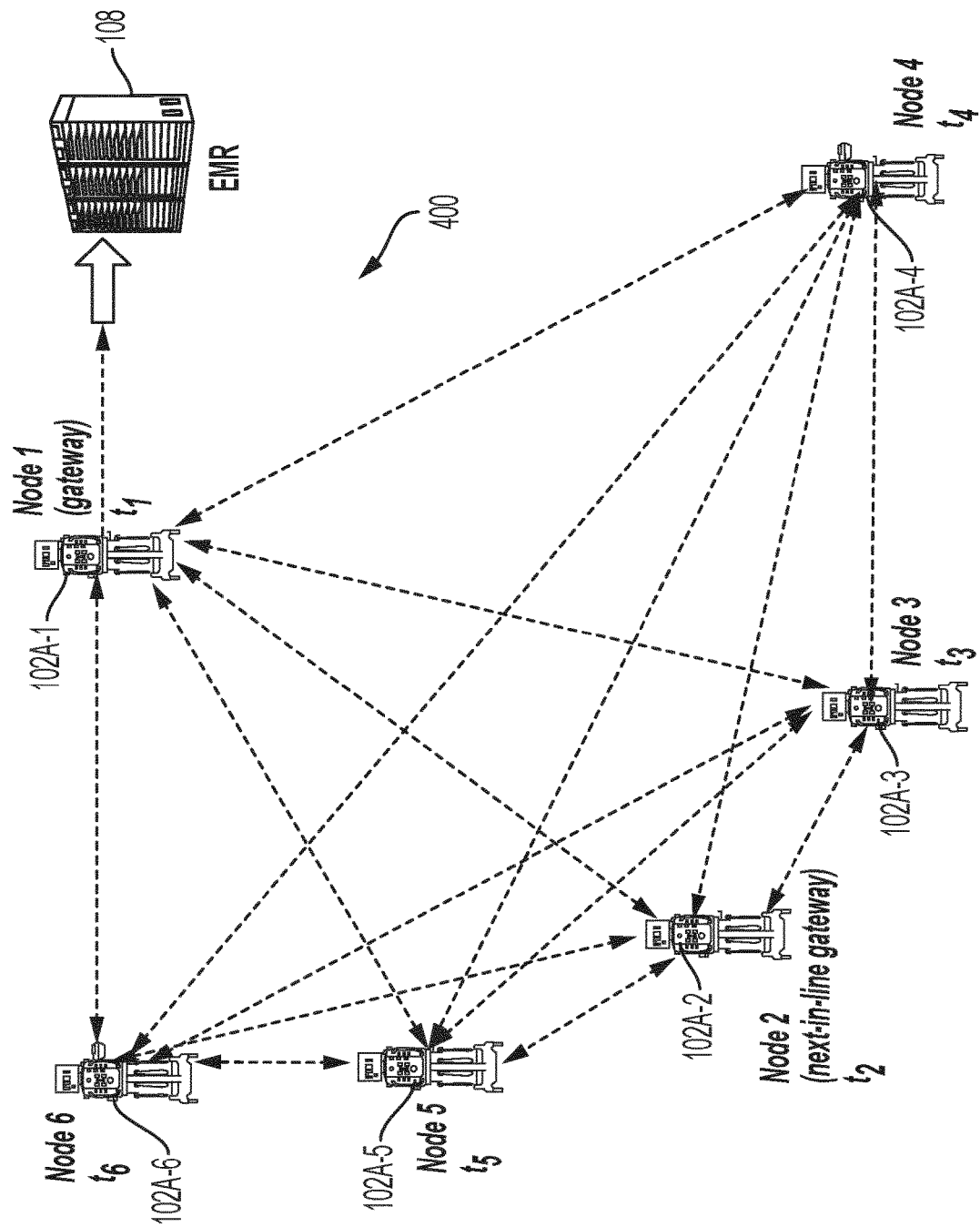
FIG. 4 is a diagram of an example proprietary communication network that is hosted by a plurality of DCMs, according to an example embodiment of the present disclosure.

As discussed above, the example DCM 102 of FIGS. 1 to 3 is configured to host or otherwise participate in a proprietary communication network that is separate from a medical network. FIG. 4 shows a diagram of an example proprietary communication network 400 that is hosted by a plurality of DCMs, according to an example embodiment of the present disclosure. In the illustrated diagram, only the DCMs 102 are referenced, wherein each DCM is connected to a respective medical device 104 (i.e., CRRT machines).

As shown in FIG. 4, the proprietary communication network 400 formed by the DCMs 102 includes a mesh network where each DCM 102 may communicate wirelessly with other in-range DCMs. Any out of range DCMs may be connected to the network 400 via at least one other DCM. In other examples, the DCMs 102 may arrange themselves to communicate in an ordered sequence such that each DCM is a router or switch between other DCMs.

In the illustrated embodiment, the DCMs 102 share the same proprietary communication network 400 protocol and are able to include additional DCMs as they come online and are within range of the network 400. FIG. 4 shows that one DCM 102A-1, designated as a node gateway, provides a primary interface (via its medical network interface 310) to the EMR server 108 via the medical network 106. In this configuration, the other DCMs 102A-2 to 102A-6 transmit medical device data 303 to the DCM 102A-1 for transmission to the EMR server 108. The gateway node DCM 102A-1 provides a single point of connectivity access for the other DCMs 102A-2 to 102A-6, which reduces the number of ports that are needed for connection to the medical network 106. This reduces configuration time as each DCM 102 is brought online since network credentials do not need to be installed. Instead, the DCMs 102 may share network credentials with new DCMs are they are brought online as part of a protocol of the proprietary communication network 400. The illustrated configuration also improves security by limiting network access to the DCMs 102A-2 to 102A-6.

Figure 5:
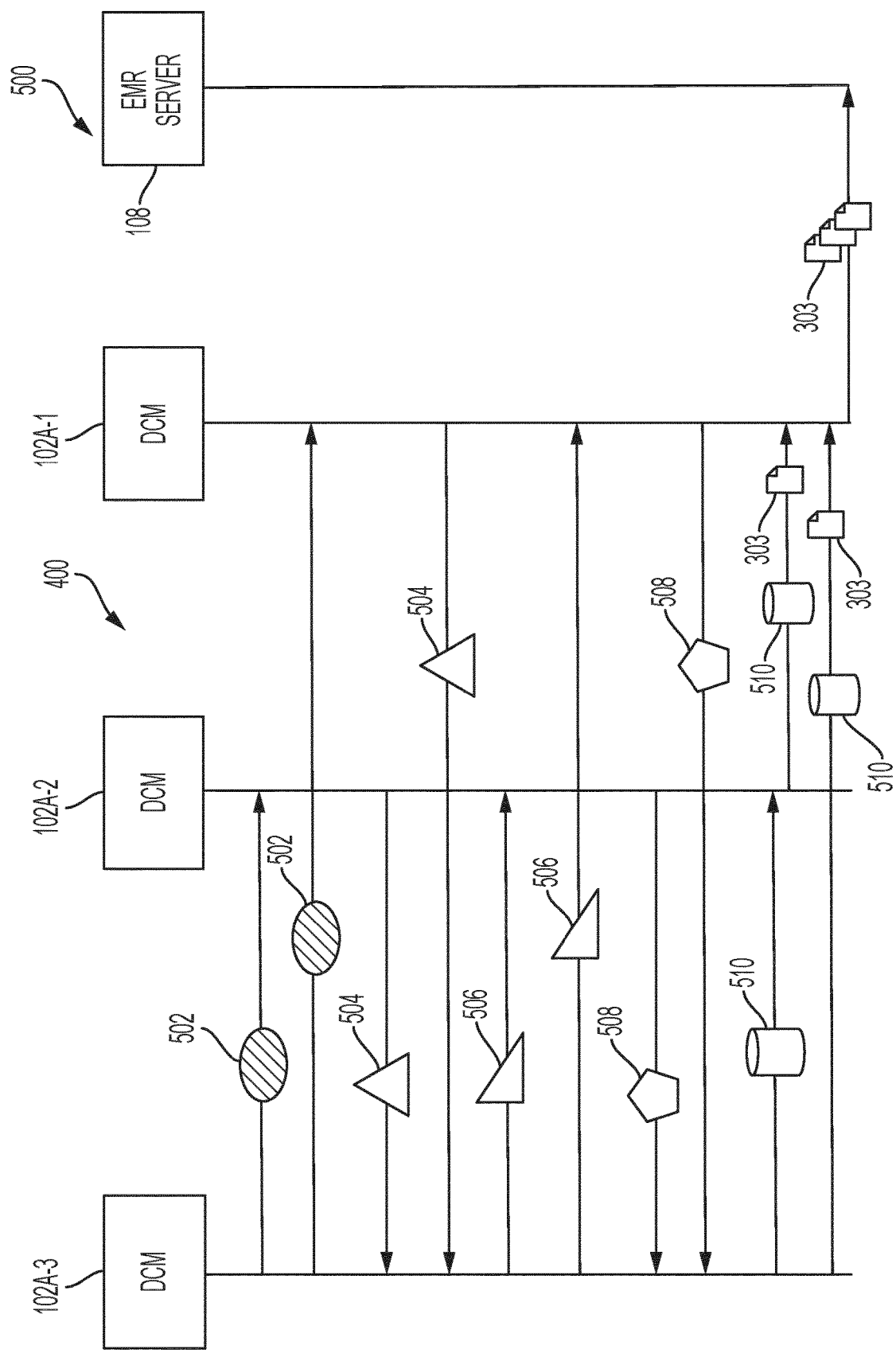
FIG. 5 is a data flow diagram illustrating a messaging protocol of the proprietary communication network of FIG. 4 when a DCM is activated, according to an example embodiment of the present disclosure.

FIG. 5 shows a data flow diagram 500 that is illustrative of a messaging protocol of the proprietary communication network 400 when a DCM 102 is activated, according to an example embodiment of the present disclosure. In the illustrated embodiment, initially DCMs 102A-1 and 102A-2 host the proprietary communication network 400. Further, 102A-1 is designated at the host gateway that communicates with the EMR server 108. In this example, the host gateway is determined based on which DCM 102 activated earliest. In other examples, the host gateway may be determined based on which of the DCMs 102 has a more robust communicate connection with the EMR server 108, which DCM 102 is connected to the most other DCMs or any other arrangement specified by the protocol of the proprietary communication network 400.

In this example, DCM 102A-3 comes online or is activated. Its activation may occur when its corresponding medical device 104 is powered on for a treatment. After being powered on, the DCM 102A-3 (via the configuration file manager 330) broadcasts an awake message 502 over the proprietary communication network 400. The awake message 502 may include an identifier of the DCM 102A-3. The awake message 502 may also include a request for an acknowledgment message. In other instances, the DCMs 102A-1 and 102A-2 (via the configuration file manager 330) are configured to automatically transmit a response message 504 to the awake message 502. The response messages 504 may include an address and/or identifier of the respective DCMs 102A-1 and 102A-2. This initial handshake provides an indication to the DCMs 102 as to which other DCMs are within wireless communication distance of each other.

The example DCM 102A-3 may then transmit a registration message 506 respectively to each of the DCMs 102A-1 and 102A-2 using an identifier or address provided in the response message 504. In other instances, the DCM 102A-3 may broadcast the registration message 506. The registration message 506 includes an address and/or identifier of the DCM 102A-3. The registration message 506 may include network authentication information, which ensures that only DCMs (or medical devices) of a certain manufacturer may form or connect to the proprietary communication network 400. The registration information 506 further includes date/time information (via the log manager 334) that indicates when the DCM 102A-3 was powered or activated.

The DCMs 102A-1 and 102A-2 authenticate the DCM 102A-3, if needed, and record the registration information into respective configuration files 332. The DCMs 102A-1 and 102A-2 may also re-transmit the registration information to other DCMs in the network 400 to ensure that any out-of-range DCMs receive the registration information. The DCMs 102A-1 and 102A-2 (including any out-of-range DCMs), if the registration is successful, transmit respectively registration response messages 508. The example messages 508 are indicative that the registration was successful and that the DCM 102A-3 is part of the network 400. The response messages 508 may also include a date/time that each of the DCMs 102A-1 and 102A-2 respectively turned on and/or other information in their respective configuration files 332, such as activation times for other DCMs, settings for the medical network 106, etc.

Figure 6:
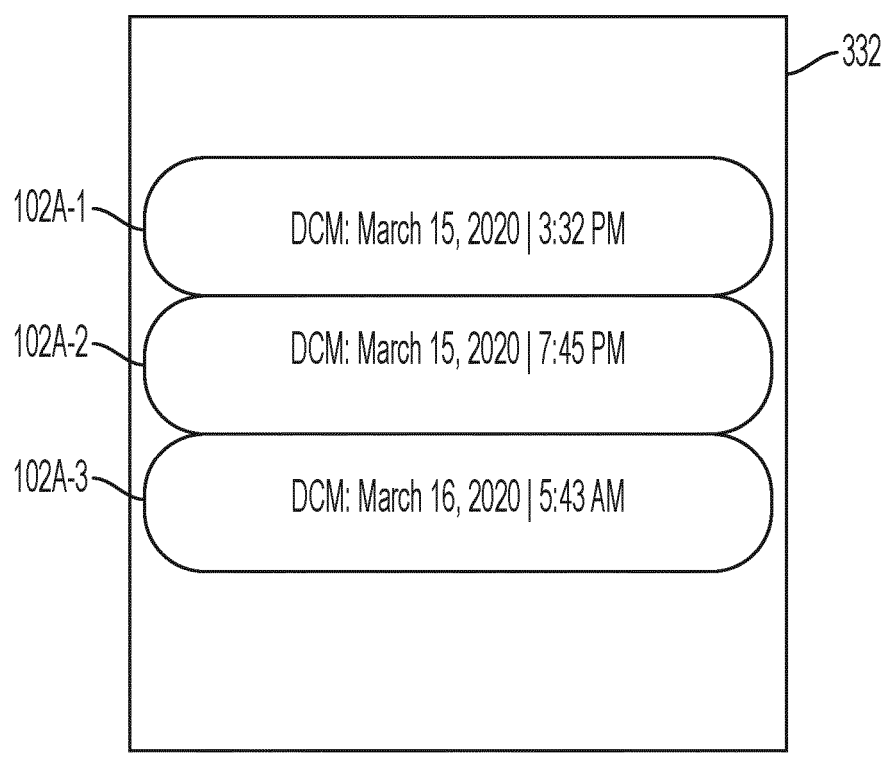
FIG. 6 is a diagram illustrating at least a portion of a configuration file existing after the activated DCM of FIG. 5 is registered, according to an example embodiment of the present disclosure.

FIG. 6 shows at least a portion of the configuration file 332 after the DCM 102A-3 is registered, according to an example embodiment of the present disclosure. The configuration file 332 shows dates/times that each DCM was activate, turned on or otherwise powered. It should be appreciated that each DCM 102 includes the portion of the configuration file 332 shown in FIG. 6. This enables the DCMs 102 to each determine the node gateway independently based on protocol rules without relying on a master DCM. In the illustrated embodiment, the DCM 102A-1 has the earliest date/time and is designated by each of the DCMs 102 as the node gateway, as shown in FIG. 4.

Returning to FIG. 5, after registration, the DCMs 102 periodically (e.g., every one second, five seconds, ten seconds, thirty seconds, one minute, etc.) broadcast heartbeat messages 510 (heartbeat messages from the DCM 102A-1 are not shown for brevity). The heartbeat messages 510 may include an identifier of the DCM and are indicative that the DCM 102 is still an active node on the network 400. If a heartbeat message is not received by a DCM 102 within a specified time limit, the DCM 102 may broadcast a ping message for the missing DCM or otherwise designate the missing DCM as disconnected (by removing its date/time activation information). It should be appreciated that the communication discussed in connection with FIG. 5 occurs through the proprietary network interface 312 of each DCM 102.

FIG. 5 also shows that since the DCM 102A-1 is the node gateway, the DCMs 102A-2 and 102A-3 transmit their medical device data 303 to the DCM 102A-1. The DCM 102A-1 then transmits the received medical device data 303 collectively to the EMR server 108 (via the medical network interface 310). In some embodiments, the DCMs 102, as part of the proprietary protocol, may coordinate when snapshots of medical device data are recorded/transmitted. In an example, the DCMs may record snapshots at different offsets from each other such that data transmission to the node gateway DCM 102 is tapered (thereby reducing transmission bottlenecks over network bandwidth limitations issues). This enables the node gateway DCM 102 to spread the transmission of medical device data 303 overtime to the EMR server 108.

Figure 7:
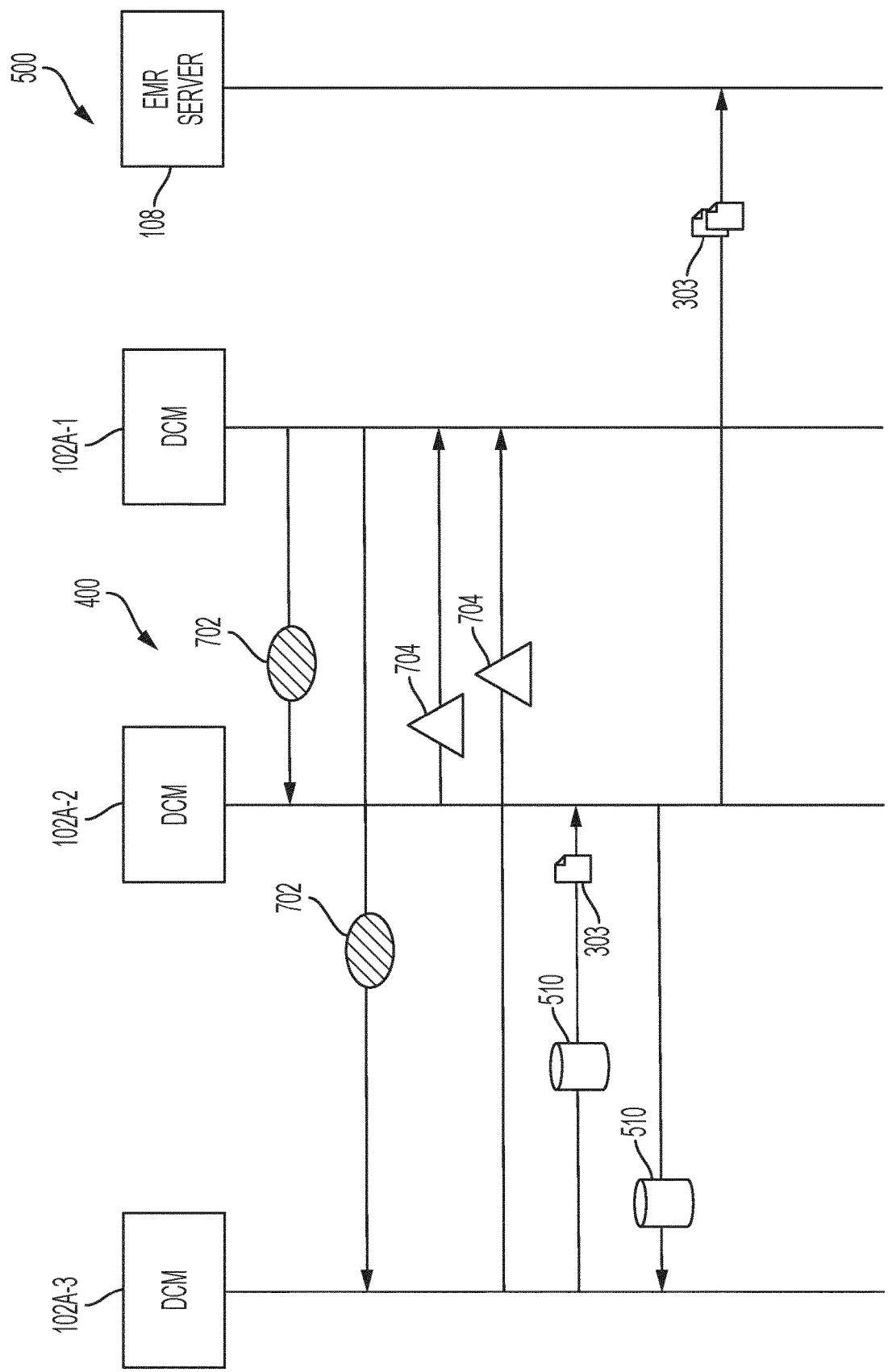
FIG. 7 is a data flow diagram illustrating a messaging protocol of the proprietary communication network of FIG. 4 when a DCM is powered off, according to an example embodiment of the present disclosure.

FIG. 7 shows a data flow diagram 700 that is illustrative of a messaging protocol of the proprietary communication network 400 when a DCM 102 is powered off, according to an example embodiment of the present disclosure. In the illustrated embodiment, the node gateway DCM 102A-1 is deactivated and/or its corresponding medical device 104 is powered off or deactivated. Before the DCM 102A-1 shuts down, it transmits or broadcasts a deactivation message 702, which may include an identifier of the DCM 102A-1. The deactivation message 702 is indicative that the DCM 102A-1 will be offline (and not available as the node gateway). In some embodiments, the DCMs 102A-2 and 102A-3 transmit response messages 704 that are indicative that the deactivation message 702 was received. The response messages may also be used to replay the deactivation information to other DCMs that are not in communication range of the DCM 102A-1. After receiving at least one response message 704, the DCM 102A-1 powers off. Additionally, the other DCMs 102A-2 and 102A-3 update their configuration files 332 to remove the entry of the DCM 102A-1 or otherwise indicate that the DCM 102A-1 is not active.

Using protocol rules, the DCMs 102 determine independently that the DCM 102A-2 is now the node gateway. The configuration file manager 330 of the DCM 102A-2 may restart its medical network interface 310 for communication with the EMS server 108. In some embodiments, this may include the DCM 102A-2 transmitting an activation message that indicates to the EMR server 108 that the DCM 102A-2 is the node gateway. In other instances, since the DCMs 102 may share network settings (including a destination IP address), the handoff to the DCM 102A-2 is seamless as it can use the network settings to seamlessly communicate with the EMR server 108 in place of the DCM 102A-1. In some instances, the DCM 102A-2 may transmit a confirmation message to the other DCMs 102A-3 via the proprietary network interface 312, which indicates that the DCM 102A-2 is available as the node gateway. At this point, the DCMs 102 broadcast heartbeat messages 510 at periodic intervals. For data transmission, the DCM 102A-3 transmits medical device data 303 to the DCM 102A-2. The DCM 102A-2 then transmits the received medical device data 303 and its medical device data 303 to the EMR server 108 at designated times (or snapshot intervals).

IV. EXAMPLE DISPOSABLE/CONSUMABLE TRACKING EMBODIMENT

Figure 8:
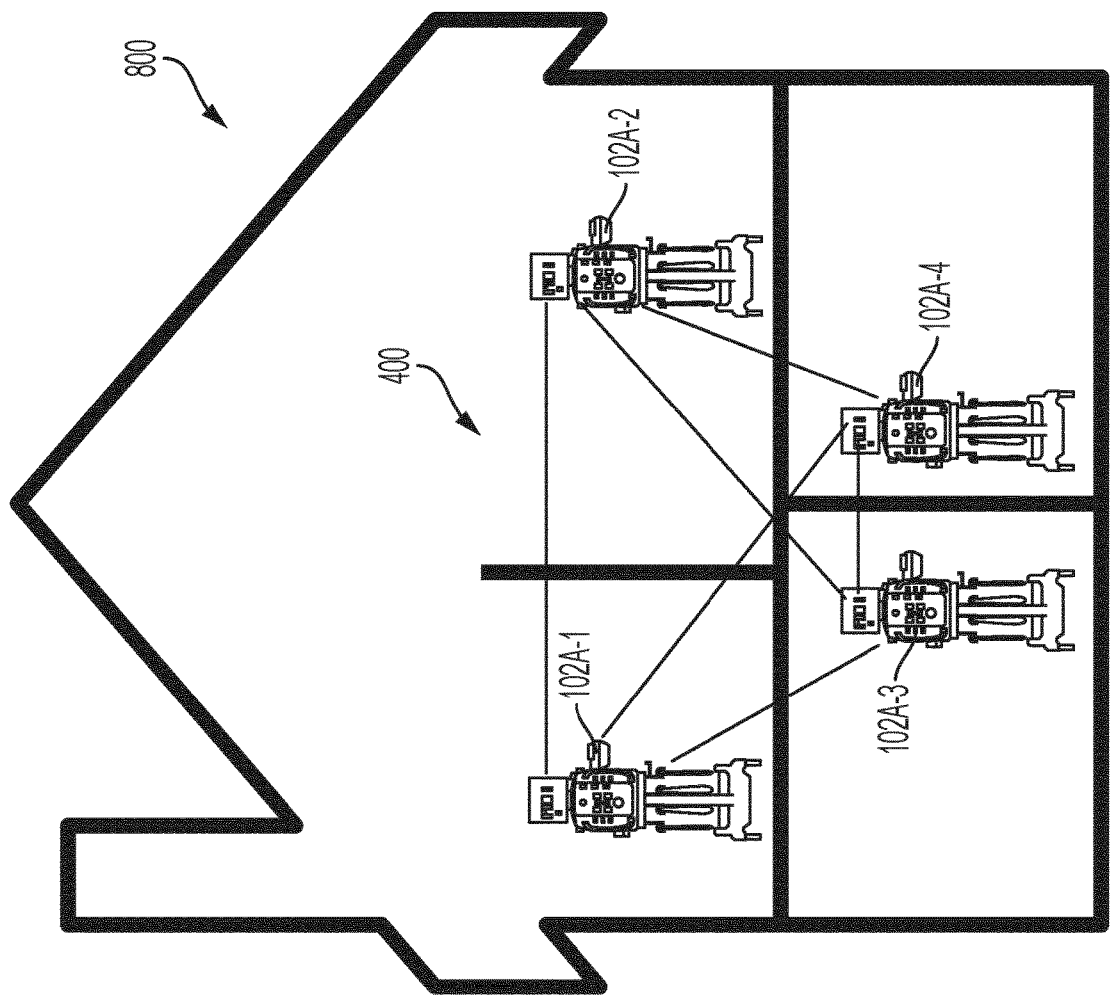
FIG. 8 is a diagram of an embodiment in which the proprietary communication network of FIG. 4 is used for tracking usage of medical device disposable or consumable items, according to an example embodiment of the present disclosure.

As discussed above, the hosting of the proprietary communication network 400 via the DCMs 102 enable features to be implemented that may not be supported by the medical network 106 and/or the EMR server 108. FIG. 8 shows a diagram of an embodiment where the proprietary communication network 400 is used for tracking medical device usage of disposable or consumable items in a medical facility or a patient's home 800, according to an example embodiment of the present disclosure.

In some embodiments, the log manager 334 of the DCM 102 is configured to analyze the medical device data 303 for disposable/consumable information. The log manager 334 retains a log file in the database 324 that tracks disposable/consumable usage. The log manager 334 may track usage and/or replacement of filters, cassettes, line sets, dialysis solution, saline solution, renal replacement solution, warmer bags, and/or disposable sensors. The medical device 104 may include usage information as event information that is included with the medical device data. For example, the medical device may detect or determine every time a solution bag is replaced, a sensor is replaced, etc. In some instances, some consumables/disposables may be replaced after each treatment or a specified number of treatments.

The DCMs 102 may communicate their consumable/disposable usage information among each other. In this configuration, each DCM 102 retains a fleet aggregate for all medical devices that are part of the network 400. The node gateway DCM 102 may transmit periodically a message to the EMR server 108 or a hospital inventory management server via the medical network 106, which causes consumables/disposables to be reordered as estimated quantities are diminished. Thus, if a node gateway DCM 102 goes offline, the next DCM 102 has the fleet aggregate as well. In other embodiments, only a designated DCM, such as the node gateway DCM 102 retains fleet aggregate numbers.

In some embodiments, the DCM 102, via the configuration file manager 330 is configured to manage inventory replenishment. In these embodiments, the DCMs 102 receive an indication of available inventory. The indication may be entered into at least one of the medical devices or received from a server via the medical network interface 310. In some instances, the medical network interface 310 may be configured to communication with a wide area network, such as the Internet, to provide for inventory tracking with a supplier.

As shown in FIG. 8, the DCMs 102 track consumable/disposable usage for each respective medical device. For example, the DCM 102A-1 determines that the corresponding CRRT 1 has consumed two M100 filter sets, five dialysis solution bags, and two replacement solution bags. The DCMs use the proprietary communication network 400 to share and aggregate disposable/consumable usage. The node gateway DCM 102 compares the aggregate to auto-generation limits to determine if a replenishment message is to be generated. In some embodiments, the node gateway and/or all of the DCMs 102 may track consumption rates to estimate when inventory will fall below a threshold and accordingly generate a replenishment message.

V. EXAMPLE PATIENT FLUID MANAGEMENT EMBODIMENT

Figure 9:
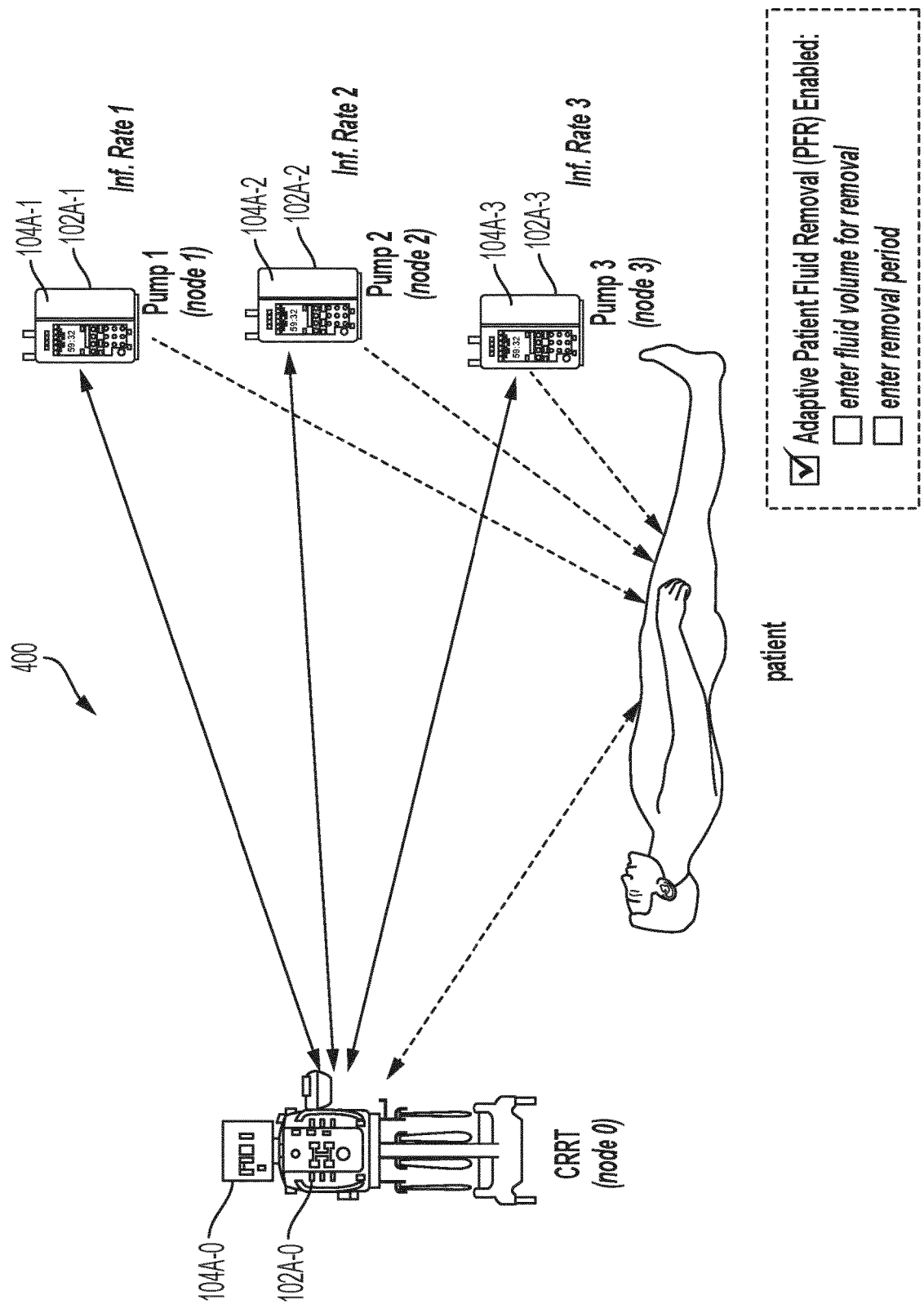
FIG. 9 is a diagram of the proprietary communication network of FIG. 4 configured for patient fluid management, according to an example embodiment of the present disclosure.

In some embodiments, multiple medical devices 104 on the same proprietary communication network 400 (hosted by respective DCMs 102), may communicate with each other to facilitate a medical treatment. In one example, infusion pumps and dialysis machines may communicate for fluid management. FIG. 9 shows a diagram of the proprietary communication network 400 of FIG. 4 configured for patient fluid management, according to an example embodiment of the present disclosure.

In the illustrated embodiment, a DCM 102A-0 of a CRRT medical device 104A-0 are part of the proprietary communication network 400 with three infusion pump medical devices 104A-1 to 104A-3 and corresponding DCMs 102A-1 to 102A-3. FIG. 9 omits other medical devices that may also be part of the proprietary communication network 400. The illustrated DCMs 102 via respective configuration file managers 330 determine that they are each assigned to a same patient. In an example, the medical devices 104 are programmed with a patient identifier as part of a treatment setup. Before treatments begin, the DCMs 102 receive the patient identifier, which is identified by the log manager 334. The DCMs 102 may then broadcast the patient identifier and a corresponding device address and/or identifier to determine which other DCMs are associated with the same treatment. DCMs that are part of the same treatment may share medical device data 303 amongst each other to facilitate treatment management provided by the medical device manager 336.

In the illustrated example, a clinician uses the control interface 105 of the CRRT medical device 104A-0 to enter or program an adaptive patient fluid removal, which includes a fluid volume for removal parameter and a removal period parameter (e.g., 1000 ml of fluid to be removed over 24 hours). The medical device manager 336 calculates a corresponding fluid removal rate and transmits this data to the CRRT medical device 104A-0.

During treatment, each DCM 102A-1 to 102A-3 receives medical device data 303 from the respective infusion pump medical devices 104A-1 to 104A-3. The medical device data 303 includes an infusion rate, which is transmitted by the DCMs 102A-1 to 102A-3 to the DCM 102A-0 over the proprietary communication network 400. The infusion pump medical device 104A-1 may be infusing a first fluid at a rate of 10 ml/h, while the infusion pump medical device 104A-2 may be infusing a second fluid at a rate of twenty ml/h and the infusion pump medical device 104A-3 may be infusing a third fluid at a rate of twenty-five ml/h.

The medical device data may be broadcast with the transmitting DCM identifier such that under protocol rules, the DCM 102A-0 determines the broadcast transmissions are destined for its mailbox 340, for example. In another example, the DCMs 102A-1 to 102A-3 may transmit messages with a destination address or identifier of the DCM 102A-0 to ensure only the DCM 102A-0 processes the received data. The medical device manager 336 of the DCM 102A-0 receives the infusion rates, combines the infusion rates with a dialysis fill rate of the CRRT medical device 104A-0, and determines a new target volume removal rate to meet the specified parameters. The medical device manager 336 transmits the new fluid removal rate to the CRRT medical device 104A-0, which may either be displayed by the control interface 105 as a recommendation or as a control instruction to the therapy module 107 for altering the prescribed treatment. It should be appreciated that such a configuration eliminates the need for a clinician to hand calculate a fluid removal rate based on the medical device data of multiple medical devices. The above-described configuration also enables near-real time adjustment of fluid removal rate to reflect any changes in infusion rate.

Figure 10:
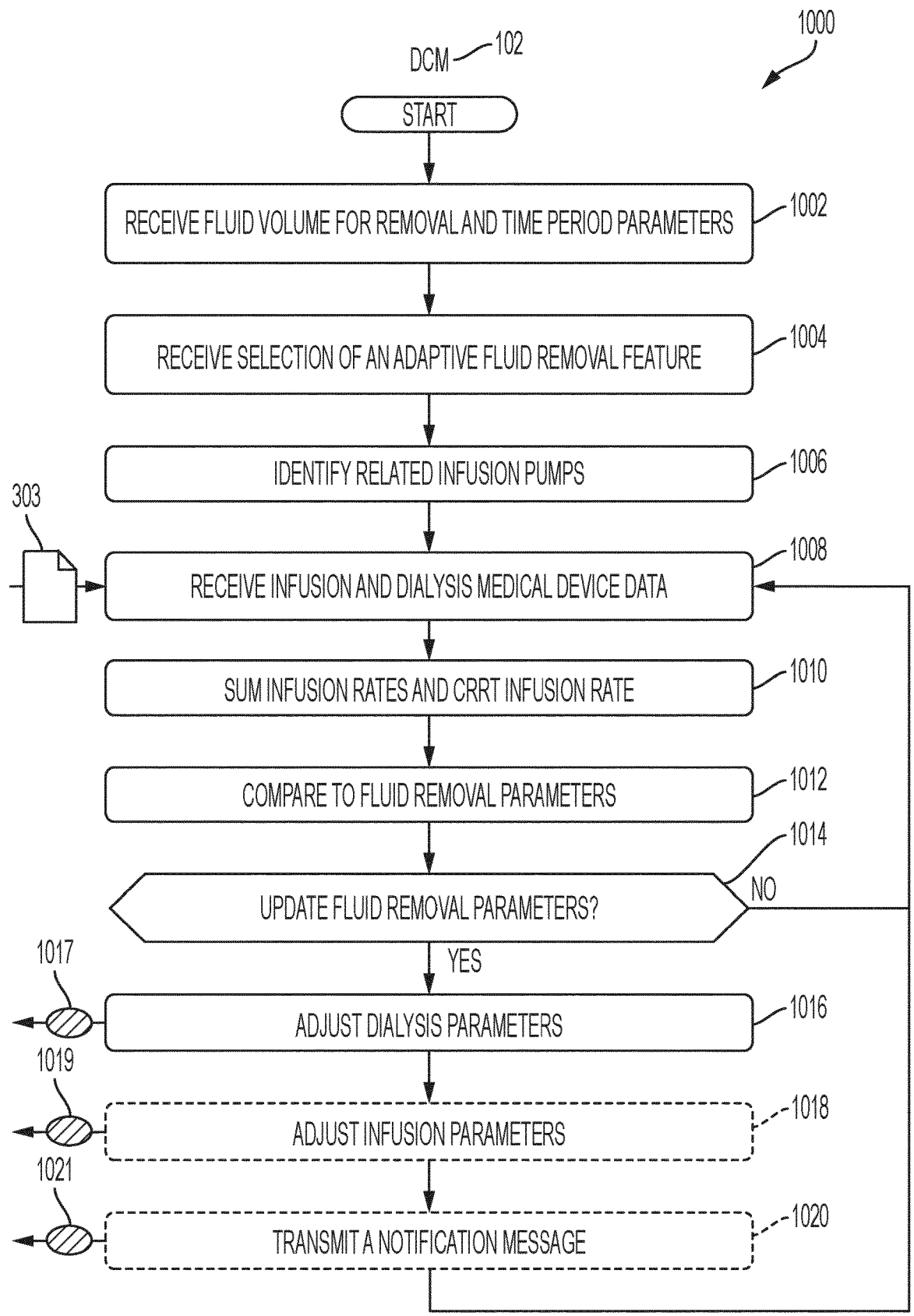
FIG. 10 is a flow diagram of an example procedure for calculating fluid removal rate using the proprietary communication network of FIG. 9, according to an example embodiment of the present disclosure.

FIG. 10 is a flow diagram of an example procedure 1000 for calculating fluid removal rate using the proprietary communication network 400 of FIG. 4, according to an example embodiment of the present disclosure. Although the procedure 1000 is described with reference to the flow diagram illustrated in FIG. 10, it should be appreciated that many other methods of performing the steps associated with the procedure 1000 may be used. For example, the order of many of the blocks may be changed, certain blocks may be combined with other blocks, and many of the blocks described may be optional. In an embodiment, the number of blocks may be changed. Further, the steps of updating the infusion pump medical devices 104A-1 to 104A-3 and providing a notification message to a clinician may be omitted. The actions described in the procedure 1000 are specified by one or more instructions and may be performed among multiple devices including, for example, the DCM 102A-0 and/or the medical device 104A-0

The example procedure 1000 begins when the DCM 102A-0 receives an indication (via event medical device data 303) that a clinician has selected a fluid volume for removal parameter and a removal period parameter (amongst other parameters) for a CRRT treatment (block 1002). The DCM 102A-0 also receives an indication that the clinician has selected an adaptive fluid removal feature (block 1004). The selection of the adaptive fluid removal feature causes the DCM 102A-0 to transmit a broadcast message with its identifier and/or address to determine other medical devices that are also associated with the same patient (block 1006). In response to the broadcast message, the DCMs 102A-1 to 102A-3 of the infusion pump medical devices 104A-1 to 104A-3 transmit response messages that are indicative of the same patient identifier, and/or a medical device type. In some instances, the DCM 102A-0, after receiving the response messages, transmits or broadcasts messages that are intended for the DCMs 102A-1 to 102A-3 requesting that infusion rate medical device data 303 be transmitted. In other embodiments, the initial broadcast message may identify the medical device data that is needed.

As shown in FIG. 10, the DCMs 102A-1 to 102A-3 transmit messages with a destination address and/or identifier of the DCM 102A-0 that include infusion rate medical device data 303 (block 1008). The DCM 102A-0 receives and sums the data 303 and with a dialysis fill rate that is included in medical device data 303 from the CRRT medical device 104A-0 to determine a total rate of fluid being provided to the patient (block 1010). The DCM 102A-0 then compares the total fluid rate to the adaptive fluid parameters to ensure the fluid volume for removal will be satisfied by the specified time period (block 1012). The DCM 102A-0 uses the comparison to determine if an adjustment is needed to the infusion treatments and/or the CRRT treatment (block 1014). The determination may be made by the medical device manager 336 of the DCM 102A-0 determining if fluid removal trends will satisfy the desired removal rate.

If no adjustment is needed, the DCM 102A-0 returns to block 1008, where subsequent medical device data 303 is received (e.g., the next snapshot of data). If an adjustment is needed, the medical device manager 336 of the DCM 102A-0 determines a new fluid removal rate for the CRRT medical device 104A-0, so as to satisfy the fluid volume parameter and time parameter (block 1016). The DCM 102A-0 then transmits a message 1017 to the CRRT medical device 104A-1 that is indicative of the new fluid removal rate. In some embodiments, the CRRT medical device 104A-1 displays the removal rate on the control interface 105 as a treatment recommendation. In other embodiments, the CRRT medical device 104A-1 routes the message 1017 to the therapy module 107 for updating the CRRT treatment with the new fluid removal rate.

In some embodiments, the DCM 102A-0 may also determine an adjustment to one or more of the infusion rates (block 1018). In these embodiments, the DCM 102A-0 transmits a message 1019 intended for the appropriate DCM 102A-1 to 102A-3 with the modified infusion rate. In a similar manner, the specified DCM 102A-1 to 102A-3 displays a recommendation or alters a treatment.

Further, in some embodiments, the notification processor 316 may generate a notification message 1021 that is indicative of the fluid removal rate change/recommendation and/or the infusion pump infusion rate change/recommendation (block 1020). The DCM 102A-1 transmits the notification message 1021 to a designated clinician device 322 via the network 400 and/or a separate wireless communication link via the clinician device interface 314. The example procedure 1000 of FIG. 10 continues by returning to block 1008 for the subsequent snapshot (or stream) of medical device data 303.

VI. CLINICIAN DECISION SUPPORT EMBODIMENT

Figure 11:
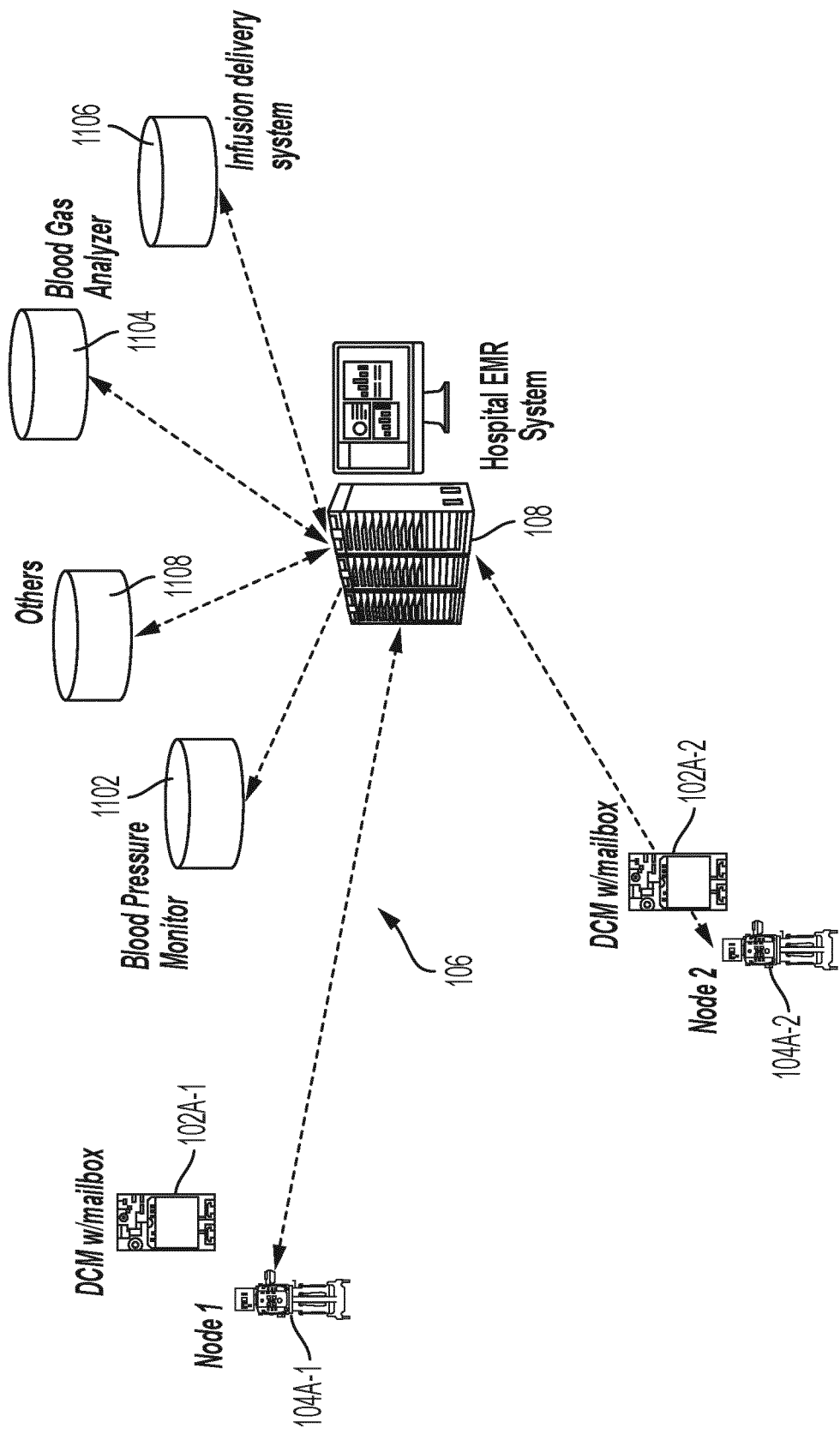
FIG. 11 is a diagram of the DCM of FIGS. 1 to 3 configured to provide clinician decision support, according to an example embodiment of the present disclosure.

In some embodiments, the DCM 102 (the medical device manager 336) is configured to analyze medical device data 303 from a connected medical device 104 in combination with medical device data and/or laboratory results from devices that are outside of the proprietary communication network. Instead, the medical device data from these other devices is stored to a patient's EMR via the EMR server 108 and are only available via the medical network 106. FIG. 11 shows a diagram of a clinician decision support embodiment in which the DCM 102 is configured to provide decision support for a connected medical device 104 using, in part, medical device data received from the EMR server 108, according to an example embodiment of the present disclosure.

FIG. 11 shows a diagram of the DCM 102 of FIGS. 1 to 3 configured to provide clinician decision support, according to an example embodiment of the present disclosure. In the illustrated example, DCMs 102A-1 and 102A-2 are associated with CRRT medical devices 104A-1 and 104A-2. Each of the DCMs 102A-1 and 102A-2 (e.g., the respective medical network interface 310) is connected to the EMR server 108 via the medical network 106. Additionally, the EMR server 108 is communicatively coupled via the medical network 106 to a blood pressure monitor 1102, a blood gas analyzer 1104, an infusion delivery system 1106, and other devices 1108. The other devices may include a laboratory server that provides lab results, a pharmacy server that provides prescribed medications, a weight scale, a thermometer, a heart rate monitor, etc.

In the illustrated embodiment, the medical device manager 336 of the DCMs 102A-1 and 102A-2 is configured for bi-directional communication with the EMR server 108. To receive data from the EMR server 108, the medical device manager 336 may determine a patient identifier of a patient connected to or associated with the corresponding CRRT medical device 104. The medical device manager 336 transmits a request message to the EMR server 108 via the medical network interface 310. The request message includes the patient identifier and an identifier and/or a network address of the DCM 102.

The EMR server 108 identifies the patient's EMR record and identifies the requested data. The EMR server 108 then transmits the identified data to the mailbox 340 of the requesting DCM 102. In some instances, the request from the DCM 102 causes the EMR server 108 to provide a stream of data as the data is received from the relevant device 1102 to 1108 for a specified duration and/or treatment.

The example medical device manager 336 of the DCM 102 is configured to combine the data received form the EMR server 108 with the medical device data 303 received from the respective medical device 104. The medical device manager 336 may then apply one or more rules or criteria to the combined data.

In some embodiments, the one or more rules or criteria may specify that certain of the received data is to be displayed at the medical device 104. The medical device manager 336 accordingly transmits the specified data to the therapy module 107 for display on the control interface 105 of the medical device 104. In other instances, the medical device manager 336 may store the specified data to the mailbox 340. In these other instances, the therapy module 107 may periodically poll the mailbox 340 for data that is to be displayed. In some instances, the medical device manager 336 may identify a treatment recommendation or adjustment, where information indicative of the recommendation or adjustment is stored in the mailbox 340 and/or transmitted to the medical device 104 for display. In further embodiments, the medical device manager 336 may determine parameter and/or treatment adjustments based on the comparison to the rules and/or criteria. In these embodiments, the medical device manager 336 transmits the new parameters or adjustment information to the mailbox 340 or to the therapy module 107 to change an ongoing or subsequent treatment that is provided by the medical device 104.

In an example, the DCM 102 may receive blood pressure data from the EMR server 108 during a CRRT treatment. In response, the DCM 102 may determine that a dwell phase or a drain phase of the CRRT treatment should be extended based on one or more rules and/or criterion stored in the database 324. The DCM 102 may transmit a recommendation to increase the dwell or drain phase, or cause the CRRT medical device 104 to increase the dwell or drain phase duration.

It should be appreciated that the DCM 102 is in one embodiment an edge-computing node in the medical network 106. For a proprietary communication network, a plurality of DCMs 102 for edge-computing nodes, where at least some clinical decision making occurs at the edge of the medical network 106 rather than in a centralized location, such as at the EMR server 108. Such a configuration may reduce computational resources at the EMR server 108 and prevent processing bottlenecks that may be common from centralized clinical support.

VII. CLINICIAN EVENT NOTIFICATION EMBODIMENT

Figure 12:
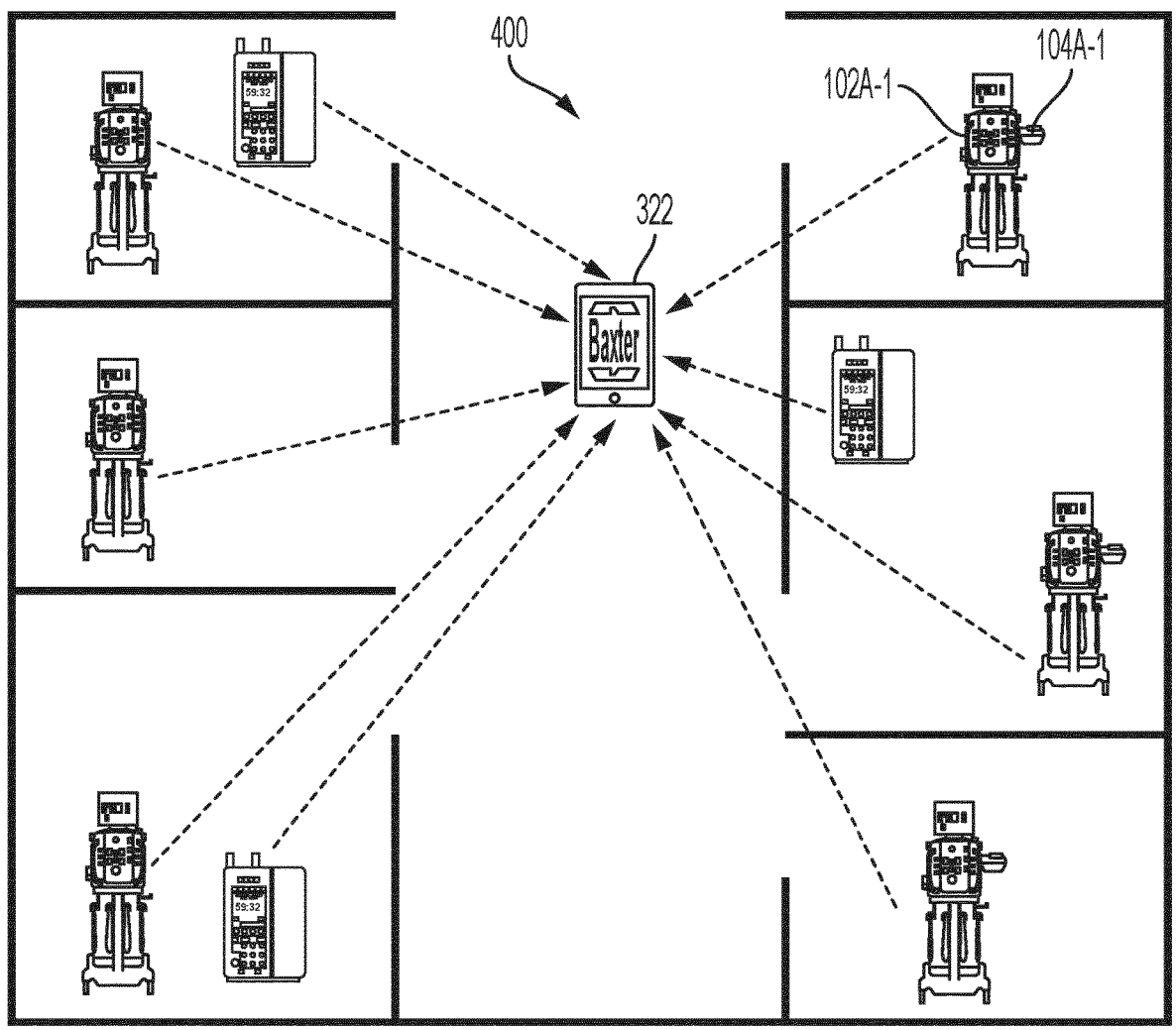
FIG. 12 is a diagram illustrating how the proprietary communication network of FIG. 4 is used to provide notification messages to clinician devices, according to an example embodiment of the present disclosure.

As discussed above, the DCM 102 of FIGS. 1 to 3 includes a notification processor 316 for generating notification messages for clinician devices 322. FIG. 12 shows a diagram that is illustrative as to how the proprietary communication network 400 of FIG. 4 is used to provide notification messages to clinician devices 322, according to an example embodiment of the present disclosure. In the illustrated embodiment, DCMs 102 of medical devices 104 are configured to transmit notification messages to a registered clinician device 322. In instances where the clinician device 322 is capable of interfacing with the proprietary communication network 400 (e.g., via a Bluetooth® transceiver, the DCMs 102 are configured to use their proprietary network interface 312. In instances where a separate connection to the clinician device 322 is needed, the DCMs 102 are configured to use the clinician device interface 314.

The configuration shown in FIG. 12 enables the clinician device 322 to receive notifications regarding the status of connected medical devices 104 without the clinician having to be in close proximity to the medical devices. The status may include alarms, alerts, and/or events. The remote access of the medical devices may be important when it is not feasible for a clinician to be at a patient's bedside for a long duration, such as for treatments of highly infectious diseases like COVID-19. Further, as shown in FIG. 12, a single clinician device 322 may be used to concurrently monitor, for example, nine different medical devices 102.

It should be appreciated that the disclosed embodiment enables personal mobile devices to receive medical notifications, even when the medical network 106 does not have such a capability. As such, medical device manufacturers are able to provide remote monitoring and control for clinician devices 322 without affecting the medical network 106. Such a configuration provides another layer of security since the clinician devices 322 never have to connect to the medical network 106 for configuration or to receive notifications, thereby eliminating a potential security entry point into the network. Further, access to the network 400 and/or the DCMs 102 is local, which prevents remote malicious applications from even being able to reach the network 400 or related medical devices.

During a registration phrase (described below), a clinician accesses the DCM 102 to complete a template form as to which notifications are desired, including setting thresholds and/or conditions as to when the notifications are to be generated. For example, a clinician may complete a form to receive pressure alarms, empty bag alarms, filter clotting alarms, fresh bag low alerts, etc. The form may also enable a clinician to priority when and/or which notifications are provided.

The example notification processor 316 of the DCM 102 compares medical device data 303 to the criteria specified by the clinician. When at least one of the criteria is met, the notification processor 316 creates a notification message (e.g., a text or SMS message or push notification), which is transmitted to the clinician device 322 via the clinician device interface 314 and/or the proprietary network interface 312. In some instances, the clinician device 322 may be out of wireless range of at least one of the monitored medical devices 104. To address such issues, the DCMs of the proprietary communication network 400 are configured to broadcast and rebroadcast the notification messages to ensure the message reaches the clinician device 322. The network 400 may have protocol rules regarding a number of times a notification is rebroadcast. Further, in some embodiments, the clinician device 322 may provide an acknowledgement message when the notification message is received, causing the DCMs 102 to stop the broadcasting of the notification.

Figure 13:
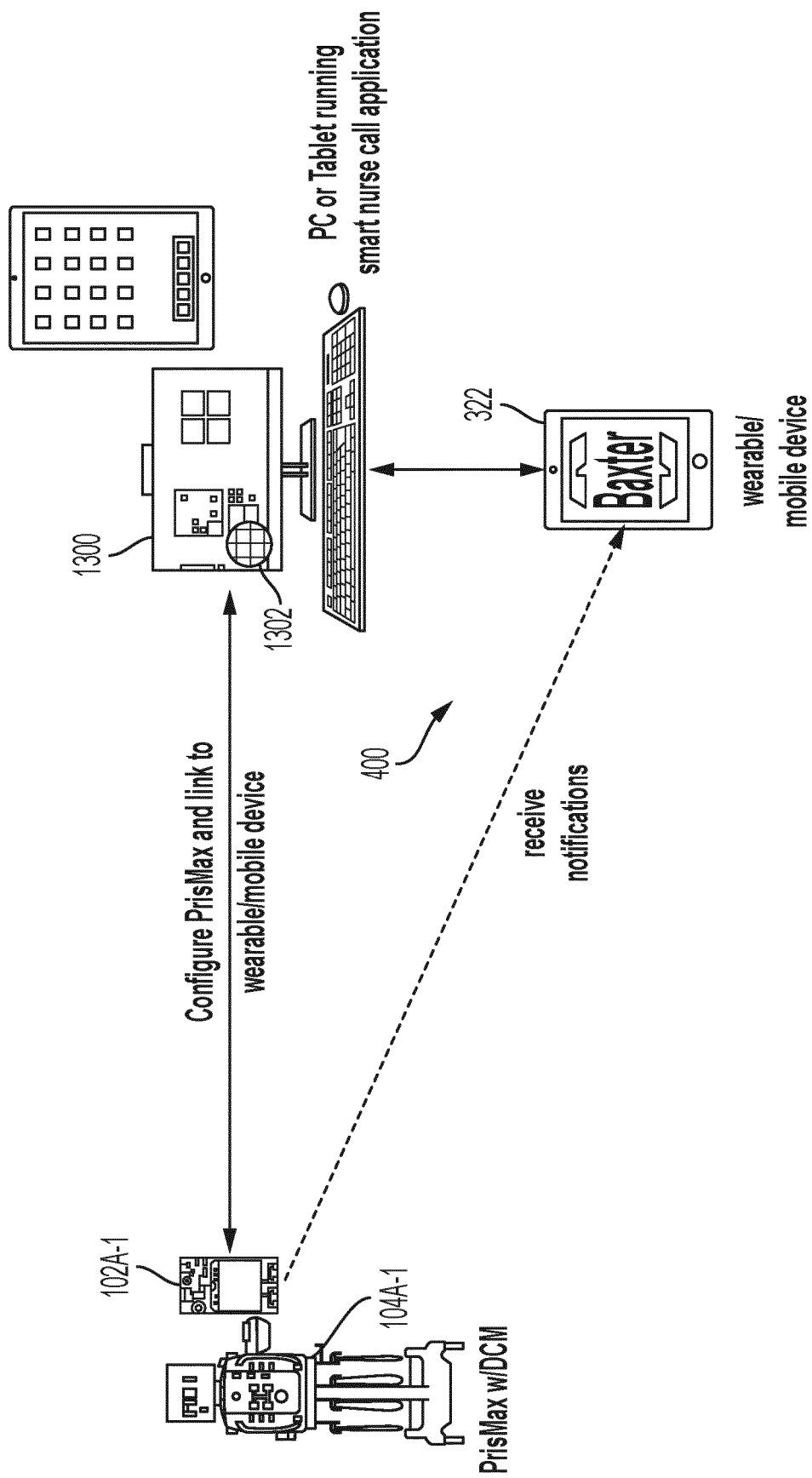
FIG. 13 is a diagram illustrating how the DCM of FIGS. 1 to 3 is configured for transmission of notification messages to the clinician device of FIG. 12, according to an example embodiment of the present disclosure.

FIG. 13 shows a diagram regarding how the DCM 102 is configured for transmission of notification messages to the clinician device 322 of FIG. 12, according to an example embodiment of the present disclosure. In the illustrated embodiment, a computer 1300 includes an application 1302 that enables a clinician to access and edit forms on a specified DCM 102. The computer 1300 may access the DCM 102 via the medical network interface 310 through the medical network 106. In this example, the application 1302 may include a field for an identifier or network address of the DCM 102 and/or the medical device 104. Entry of the identifier or address causes the application 1302 to access the DCM 102 or transmit a request message for a notification form. After receiving the form, the application 1302 displays fields for entry by a clinician as to criteria and/or conditions for receiving notifications. The clinician may also provide an identifier of their clinician device 322 for subscribing to the specified notifications.

In other embodiments, the application 1302 may additionally include fields corresponding to the form at the DCM 102. A clinician completes the fields, including DCM/medical device identifier, criteria/conditions, and destination device. After the fields are complete, the clinician causes the application 1302 to transmit one or more messages with the data from the fields to, for example, an API at the notification processor 316 of the desired DCM 102 (or broadcasts the information, where only the specified DCM 102 processes the request) for storing the received information to a notification record that is stored in the database 324.

In some embodiments, the application 1302 may also configure the clinician device 322. For example, the application 1302 may provide instructions for pairing the clinician device 322 with the proprietary communication network 400 and/or the specified DCM 102. In other instances, the application 1302 causes a notification message to be transmitted to the clinician device 322. The notification message includes a link to a script, that when selected at the clinician device 322, automatically configures the device 322 to connect to the network 400 and/or the specified DCM 102. After configuration, the clinician device 322 is capable of receiving notification messages from the DCM 102 regarding events, alarms, and/or alerts regarding the corresponding medical device 104.

The above-described notification feature provides a benefit to clinician for CRRT medical devices. Typically, CRRT medical devices have a certain number of fresh dialysis fluid bags and a certain number of drain bags. Rather than having a clinician periodically check a status of the bags, the DCM 102 uses specified criteria for transmitting a notification when the fresh bags are close to empty (e.g., within 15 to 20 minutes of being emptied). The DCM 102 also uses specified criteria for transmitting a notification when the drain bags are close to being full. The DCM 102 accordingly provides a clinician notifications via the device 322 only when attention is needed at a particular medical device, even when a medical network may not support clinician device connectivity.

VIII. Conclusion

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claime is:

1. A medical system comprising:
at least one medical device including
one or more sensors and one or more actuators,
a memory,
a processor configured to receive data from the one or more sensors and to control the one or more actuators to perform a medical task, wherein the processor has access to the memory and is configured to store data including medical device data, and
a communication unit connected to the processor, the communication unit including at least one of a serial input port, an Ethernet input port, and a wireless input port;
at least one digital communication module associated with the medical device, the digital communication module comprising
an input interface coupled for communication to the communication unit of the medical device the input interface including at least one of a serial input port, an Ethernet input port, and a wireless input port,
an output interface configured for communicative coupling to (i) an electronic medical record (EMR) server via a medical network and (ii) at least one other digital communication module via a wireless proprietary network, the output interface including at least one of a serial output port, an Ethernet output port, or a wireless output port,
a file configuration manager configured to store at least one configuration file with an identifier of the digital communication module, and
a data manager communicatively coupled to the input interface, the output interface, and the file configuration manager, the data manager configured to:
after being powered on, transmit an awake message to the at least one other digital communication module via the wireless proprietary network, the awake message including the identifier of the digital communication module and a date/time indication of the power on,
receive a response message from each of the at least one other digital communication module via the wireless proprietary network, the response message including an identifier or network address of the respective other digital communication module and a date/time indication as to when the respective other digital communication module was powered on,
receive medical device data from the medical device,
determine the medical device data is to be transmitted to the EMR server via a first of the other digital communication modules that has an earliest date/time indication, and
transmit the medical device data to the first digital communication module for transmission to the EMR server.

2. The medical system of claim 1, further comprising:
a plurality of medical devices and a plurality of digital communication modules, each of the plurality of medical devices being associated with one respective digital communication module of the plurality of digital communication modules,
wherein the plurality of digital communication modules are configured to designate one digital communication module as a node gateway that exclusively connects with the medical network, and
wherein each of the plurality of digital communication modules transmits respective medical device data at least to the node gateway digital communication module, which routes the received medical device data to the medical network.

3. The medical system of claim 1, wherein the medical device is a medical fluid delivery machine, wherein the one or more actuators include one or more pumps,
wherein the medical device is an apparatus for the treatment of renal disease with extracorporeal circulation of blood comprising:
a filtration unit having a primary chamber and a secondary chamber separated by a semi-permeable membrane;
a blood circuit comprising:
a blood withdrawal line extending between a first end connected to an inlet of the primary chamber and a second end for connection to a patient; and a blood return line extending between a first end connected to an outlet of the primary chamber and a second end for connection to the patient;
a blood pump to circulate blood in the blood circuit;
a dialysate line connected to an outlet of the secondary chamber; and
one or more lines to transfer a respective solution into the blood.

4. The medical system of claim 1, further comprising the medical network and the EMR server,
wherein the medical network includes at least one of a Wi-Fi network or an Ethernet network, wherein the digital communication module transmits the medical device data to the medical network for inclusion in the EMR server, and wherein the propriety wireless communication network is separate from the medical network.

5. A digital communication module comprising:
an input interface configured for communicative coupling to a medical device, the input interface including at least one of a serial input port, an Ethernet input port, and a wireless input port;
an output interface configured for communicative coupling to (i) an electronic medical record (EMR) server via a medical network and (ii) at least one other digital communication module via a wireless proprietary network, the output interface including at least one of a serial output port, an Ethernet output port, or a wireless output port;
a file configuration manager configured to store at least one configuration file with an identifier of the digital communication module; and
a data manager communicatively coupled to the input interface, the output interface, and the file configuration manager, the data manager configured to:
after being powered on, transmit an awake message to the at least one other digital communication module via the wireless proprietary network, the awake message including the identifier of the digital communication module and a date/time indication of the power on,
receive a response message from each of the at least one other digital communication module via the wireless proprietary network, the response message including an identifier or network address of the respective other digital communication module and a date/time indication as to when the respective other digital communication module was powered on,
receive medical device data from the medical device,
determine the medical device data is to be transmitted to the EMR server via a first of the other digital communication modules that has an earliest date/time indication, and
transmit the medical device data to the first digital communication module for transmission to the EMR server.

6. The digital communication module of claim 5, wherein the data manager is further configured to:
receive a power off message from the first digital communication module indicative that the first digital communication module is no longer available;
remove the date/time indication of the first digital communication module;
receive second medical device data from the medical device;
determine the second medical device data is to be transmitted to the EMR server via a second of the other digital communication modules that has an earliest date/time indication with the date/time indication of the first digital communication module removed; and
transmit the second medical device data to the second digital communication module for transmission to the EMR server.

7. The digital communication module of claim 5, wherein the data manager is further configured to:
receive a power off message from the first digital communication module indicative that the first digital communication module is no longer available;
remove the date/time indication of the first digital communication module;
receive second medical device data from the medical device;
determine the second medical device data is to be transmitted to the EMR server via the digital communication module based on the digital communication module having an earliest date/time indication among the other digital communication modules; and
transmit the second medical device data to the EMR server via the communicative coupling of the output interface to the medical network.

8. The digital communication module of claim 7, wherein the data manager is further configured to:
receive third medical device data from one of the other digital communication modules; and
transmit the third medical device data to the EMR server via the communicative coupling of the output interface to the medical network.

9. The digital communication module of claim 7, wherein the data manager is further configured to:
designate a new first digital communication module as a node gateway for transmission of the medical device data;
designate the new first digital communication module as the node gateway after receiving the power off message from the first digital communication module and determining that the new first digital communication module has the earliest date/time indication among the other digital communication modules; and
disable the communicative coupling to the EMR server via the output interface after designating the new first digital communication module as the node gateway.

10. The digital communication module of claim 7, wherein a processor of the medical device is configured to monitor a treatment delivery through the medical device and to determine, in particular at the end of a treatment session, first disposable or consumable usage information including:
a type and a number of single use disposables that have been used and must be substituted to execute a subsequent treatment, the disposables including disposable line sets;
a type and a number of semi-disposable elements that are exhausted or must be substituted, the semi-disposable elements including concentrates for dialysis fluid preparation or ultrafilters; or
a type and a number of broken components that must be substituted, the broken components including sensors or actuators,
wherein the processor stores the first disposable or consumable usage information in the memory, the first disposable or consumable usage information being transferred through the communication unit to the digital communication module, and
wherein the data manager is further configured to:

receive the first disposable or consumable usage information from the medical device;
receive second disposable or consumable usage information from the other digital communication modules;
combine the first and second disposable or consumable usage information; and
transmit the combined first and second disposable or consumable usage information to at least one of the EMR server or a medical supply server via the communicative coupling of the output interface to the medical network.

11. The digital communication module of claim 10, wherein the first and second disposable or consumable usage information includes information that is indicative of usage of filters, disposable cassettes, line sets, dialysis solution, saline solution, renal replacement solution, warmer bags, or disposable sensors.

12. The digital communication module of claim 5, wherein the configuration file specifies a destination network address of the EMR server, a medical device type of the connected medical device, a medical device serial number, and a timestamp from which the received medical data was generated by the medical device or received by the data manager from the medical device.

13. The digital communication module of claim 5, wherein the data manager is further configured to:
receive a stream of the medical device data;
create a snapshot of the medical device data at periodic intervals; and
provide the snapshot of the medical device data as the medical device data that is transmitted to the first digital communication module,
wherein the medical device data includes at least one of:
event information comprising transitions between fill, dwell, and drain phase of a dialysis cycle;
alarm, alert, or event information;
treatment programming information; or
medical treatment data comprising at least one of an estimated fill rate, a drain rate, or an amount of ultrafiltration removed.

14. The digital communication module of claim 5, wherein the data manager is further configured to:
use event tracking to identify changes to the medical device data between snapshots; and
include only the changed medical device data from a previous snapshot as the medical device data that is transmitted to the first digital communication module.

15. The digital communication module of claim 5, wherein the data manager is further configured to:
receive a configuration message via the output interface, the configuration message indicative of a network address of a clinician device and criteria for transmitting a notification to the clinician device;
determine at least some of the medical device data satisfies the criteria; and
transmit a notification message to the clinician device via the proprietary network that is indicative of the at least some of the medical device data satisfying the criteria.

16. The digital communication module of claim 5, further including another medical device including an infusion pump, wherein the medical device communicatively coupled to the input interface is a dialysis machine,
wherein the at least one other digital communication module is respectively associated with the infusion pump, and
wherein the medical device data from the dialysis machine includes a patient identifier and second medical device data from the infusion pump includes the same patient identifier and an infusion rate,
the data manager being further configured to:
receive an indication that an adaptive fluid removal operation is enabled;
receive parameter data that is related to the patient identifier including one or more of:
a fresh dialysis fluid flow rate entering into a filtration unit,
an effluent flow rate exiting from the filtration unit,
a pre-infusion flow rate into an extracorporeal blood circuit,
a post-infusion flow rate into the extracorporeal blood circuit,
a fluid removal target amount and a removal period, or
a fluid removal rate,
receive the second medical device data from the at least one other digital communication module via the wireless proprietary network;
determine if the at least one infusion pump is associated with the same patient identifier;
determine an amount of fluid being infused into the patient or an infusion flow rate based on the second medical device data;
determine updated parameter data based on the parameter data and the amount of fluid being infused into the patient or the infusion flow rate determined from the second medical device data, wherein the updated parameter maintains unaltered a patient fluid balance during dialysis taking into account the fluid infused with the infusion pump; and
transmit the updated parameter data to the dialysis machine via the input interface.

17. The digital communication module of claim 16, wherein the data manager is further configured to:
receive parameter data that is related to the patient identifier including:
either the fluid removal target amount and the removal period; or
the fluid removal rate for a patient that is related to the patient identifier,
wherein the updated parameter data is at least one updated flow rate for the dialysis machine based on:
i) the fluid removal target and the removal period, or the fluid removal rate; and
ii) the amount of fluid being infused into the patient or the infusion flow rate; and
transmit the at least one updated flow rate to the dialysis machine via the input interface.

18. The digital communication module of claim 17, wherein the transmission of the updated flow rate causes the dialysis machine either to display a recommendation on a screen that is indicative of the updated flow rate or to update a programmed treatment based on the updated flow rate.

19. The digital communication module of claim 17, wherein determining the at least one updated flow rate comprises recalculating one or more flow rates for the dialysis machine keeping the patient fluid balance unaltered, the one or more flow rates including one or more of the fresh dialysis fluid flow rate entering into the filtration unit, the effluent flow rate exiting from the filtration unit, the pre-infusion flow rate into the extracorporeal blood circuit, the post-infusion flow rate into the extracorporeal blood circuit, and the fluid removal rate.

20. The digital communication module of claim 5, wherein the data manager is further configured to:
- receive sensor data from the EMR server via the medical network;
- transmit, via the input interface, the sensor data to the medical device for display on a screen of the medical device;
- compare the sensor data and at least some of the medical device data to stored criteria; and
- transmit, via the input interface, at least one recommendation message to the medical device causing the screen to display information that is indicative of the comparison.

21. A process for transferring medical device data from at least one medical device to an electronic medical record (EMR) server through at least one digital communication module,
- wherein the medical device comprises:
  - one or more sensors and one or more actuators,
  - a memory,
  - a processor configured to receive data from the one or more sensors and to control the one or more actuators to perform a medical task, wherein the processor has access to the memory and is configured to store data including medical device data, and
  - a communication unit connected to the processor, the communication unit including at least one of a serial input port, an Ethernet input port, and a wireless input port;
- wherein the digital communication module comprises:
  - an input interface coupled for communication to the communication unit of the medical device, the input interface including at least one of serial input port, an Ethernet input port, and a wireless input port,
  - an output interface configured for communicative coupling to (i) the EMR server via a medical network and (ii) at least one other digital communication module via a wireless proprietary network, the output interface including at least one of a serial output port, an Ethernet output port, or a wireless output port,
  - a file configuration manager configured to store at least one configuration file with an identifier of the digital communication module, and
  - a data manager communicatively coupled to the input interface, the output interface and the file configuration manager, the process comprising:
- coupling the digital communication module to the medical device,
- coupling the digital communication module to the EMR server,
- after being powered on, transmitting, via the data manager, an awake message to the at least one other digital communication module via the wireless proprietary network, the awake message including the identifier of the digital communication module and a date/time indication of the power on,
- receiving a response message from each of the at least one other digital communication module via the wireless proprietary network, the response message including an identifier or network address of the respective other digital communication module and a date/time indication as to when the respective other digital communication module was powered on,
- receiving medical device data from the medical device,
- determining the medical device data is to be transmitted to the EMR server via a first of the other digital communication modules that has an earliest date/time indication, and
- transmitting the medical device data to the first digital communication module for transmission to the EMR server.

\* \* \* \* \*